United States Patent
Kanamori et al.

(10) Patent No.: US 9,156,322 B2
(45) Date of Patent: Oct. 13, 2015

(54) CHARGE CABLE DEVICE

(71) Applicant: DENSO CORPORATION, Kariya, Aichi-pref. (JP)

(72) Inventors: Takashi Kanamori, Nagoya (JP); Masayuki Kurimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 143 days.

(21) Appl. No.: 14/108,857

(22) Filed: Dec. 17, 2013

(65) Prior Publication Data

US 2014/0179164 A1 Jun. 26, 2014

(30) Foreign Application Priority Data

Dec. 21, 2012 (JP) ................................. 2012-279868
Oct. 25, 2013 (JP) ................................. 2013-222500

(51) Int. Cl.
*H02J 7/00* (2006.01)
*B60D 99/00* (2009.01)
*B60L 11/18* (2006.01)

(52) U.S. Cl.
CPC .............. *B60D 7/00* (2013.01); *B60L 11/1818* (2013.01); *B60L 11/1846* (2013.01); *B60L 2230/12* (2013.01); *B60L 2230/16* (2013.01); *B60L 2240/70* (2013.01); *B60L 2250/12* (2013.01); *Y02T 10/7005* (2013.01)

(58) Field of Classification Search
CPC ....................................................... Y02T 90/14
USPC .......................................................... 320/109
See application file for complete search history.

(56) References Cited

U.S. PATENT DOCUMENTS

| | | | |
|---|---|---|---|
| 5,563,493 | A | 10/1996 | Matsuda et al. |
| 2008/0315826 | A1 | 12/2008 | Alberth, Jr. et al. |
| 2011/0149455 | A1 | 6/2011 | Ueno et al. |
| 2013/0307466 | A1 | 11/2013 | Frisch et al. |

FOREIGN PATENT DOCUMENTS

| | | |
|---|---|---|
| JP | 05-048276 U | 6/1993 |
| JP | 06-217464 | 8/1994 |
| JP | 3143670 | 7/2008 |
| JP | 2009/225638 | 10/2009 |
| JP | 2010-110054 | 5/2010 |
| JP | 2010-277855 | 12/2010 |
| JP | 2014-511661 | 5/2014 |
| WO | 2012/095128 A2 | 1/2011 |

*Primary Examiner* — Edward Tso
*Assistant Examiner* — Ahmed Omar
(74) *Attorney, Agent, or Firm* — Harness, Dickey & Pierce, P.L.C.

(57) ABSTRACT

A charge cable device includes: a cable having one end detachable from a power source or another charge cable device and an electric power line for supplying electricity to a vehicle from the electric power source or another charge cable device; a charge connector on the other end of the cable detachable from a charge inlet of the vehicle; a cable connector detachable from further another charge cable device to connect between further another charge cable device and the electric power line; and a controller. When the cable connector is not attached to further another charge cable device, the controller controls to supply electricity from the one end of the cable to the charge connector. When the cable connector is attached to further another charge cable device, the controller controls an electric power supply amount of electricity to the charge connector and to further another charge cable device.

18 Claims, 23 Drawing Sheets

CHARGE CABLE DEVICE

CROSS REFERENCE TO RELATED APPLICATIONS

This application is based on Japanese Patent Applications No. 2012-279868 filed on Dec. 21, 2012, and No. 2013-222500 filed on Oct. 25, 2013, the disclosures of which are incorporated herein by reference.

TECHNICAL FIELD

The present disclosure relates to a charge cable device for supplying electricity from a charge power source to a vehicle.

BACKGROUND

Conventionally, a charge cable device having a cable extending from a charge power source such as a power supply station is well known. A charge connector to be attached to a charge inlet of a vehicle is arranged on a top of the cable. In general, the charge cable device includes a long cable for sufficiently reaching the charge inlet even when the charge cable device charges various vehicles having different positions of the charge inlet, and the vehicle parks at various parking positions in various parking directions with respect to the power supply station (i.e., a charge station).

However, the number of cable extending from the charge station is one. Accordingly, if the charge station charges electricity to multiple vehicles simultaneously, it is necessary to switch a connection. Thus, for example, when the vehicle is changed at mid night, the station can charge only one vehicle at one night.

In order to solve the above difficulties, JP-A-2010-110054 (corresponding to US 2011/0149455) teaches a charge cable unit. In this charge cable unit, the cable includes one insertion plug to a commercial power source and two charge connectors since the cable is divided into two cable parts at the middle of the cable. A switching device is arranged at the middle of the cable as a dividing point. When the unit completes to charge one vehicle with one charge connector, the unit automatically switches from the one charge connector to another charge connector so that the unit charges another vehicle with another charge connector. Thus, the electricity supply is switched from one vehicle to another vehicle so that the unit can charge two vehicles automatically.

In the above unit, since a branch system (a dividing construction) of the cable is preliminary determined, the unit can charge only preliminary determined vehicles. Thus, expandability or flexibility of the unit is very limited. Further, since the branch system of the cable is specified, non-used connector is not necessary if the number of vehicles to be charged is varied.

SUMMARY

It is an object of the present disclosure to provide a charge cable device for charging multiple vehicles, the charge cable device being expandable in accordance with the number of vehicles.

According to a first aspect of the present disclosure, a charge cable device detachable from another charge cable device includes: a cable having one end, which is detachable from an electric power source or another charge cable device, and an electric power line, which supplies electricity to a vehicle from the electric power source when the one end is attached to the electric power source, and supplies electricity to the vehicle from another charge cable device when the one end is attached to another charge cable device; a charge connector arranged on the other end of the cable, the charge connector being detachable from a charge inlet of the vehicle, and being attached to the charge inlet of the vehicle when the electric power line supplies electricity to the vehicle; a cable connector detachable from further another charge cable device, the cable connector electrically connecting between further another charge cable device and the electric power line when the cable connector is attached to further another charge cable device; and a controller controlling an electric power supply amount of electricity to the charge connector from the one end of the cable and an electric power supply amount of electricity to further another charge cable device connected to the cable connector from the one end of the cable. When the cable connector is not attached to further another charge cable device, the controller controls to supply electricity from the one end of the cable to the charge connector. When the cable connector is attached to further another charge cable device, the controller controls the electric power supply amount of electricity to the charge connector from the one end of the cable and the electric power supply amount of electricity to further another charge cable device connected to the cable connector from the one end of the cable.

In the above charge cable device, the cable connector is detachable to further another charge cable device. When the cable connector is attached to further another charge cable device, further another charge cable device is electrically connected to the electric power line. Accordingly, multiple charge cable devices can be connected to each other to function as one extending cable. When the cable connector is attached to another charge cable device, the controller controls the electric power supply amount to the charge connector from the one end of the cable and the electric power supply amount to further another charge cable device from the one end of the cable. Accordingly, the electricity can be supplied to further another charge cable device from the one end of the cable. Accordingly, multiple charge cable devices are connected to each other so as to function as a branch cable according to the number of vehicles to be charged.

For example, the electric power source is connected to the charge connector of a first vehicle via a first charge cable device, and a second charge cable device is connected to the cable connector of the first charge cable device, and the charge connector is connected to a second vehicle. Thus, multiple vehicles are connected to the electric power source via multiple charge cable devices in turn, so that multiple vehicles are electrically connected to each other at the same time. Accordingly, the appropriate number of charge cable devices is connected to each other according to the number of vehicles. Thus, expandability or scalability is high. Further, multiple charge cable devices are connected to each other as needed, the total length of the charge cable devices is minimized since unused charge cable device is not connected. Thus, since multiple charge cable devices are preliminarily connected to multiple vehicles, it is not necessary to switch the charge cable device from a vehicle to another vehicle every time the charge of the vehicle is completed. Thus, convenience is improved.

According to a second aspect of the present disclosure, a charge cable device detachable from another charge cable device includes: a cable having one end, which is attached to an electric power source, and an electric power line, which supplies electricity to a vehicle from the electric power source; a charge connector arranged on the other end of the cable, the charge connector being detachable from a charge inlet of the vehicle, and being attached to the charge inlet of the vehicle when the electric power line supplies electricity to the vehicle; a cable connector detachable from further another charge cable device, the cable connector electrically connecting between further another charge cable device and the electric power line when the cable connector is attached to further another charge cable device; and a controller controlling an electric power supply amount of electricity to the charge connector from the electric power source and an electric power supply amount of electricity to further another cable device connected to the cable connector from the electric power source. When the cable connector is not attached to further another charge cable device, the controller controls to supply electricity from the electric power source to the charge connector. When the cable connector is attached to further another charge cable device, the controller controls the electric power supply amount of electricity to the charge connector from the electric power source and the electric power supply amount of electricity to further another charge cable device connected to the cable connector from the electric power source.

In the above charge cable device, multiple charge cable devices are connected to each other so as to function as a branch cable according to the number of vehicles to be charged. Further, the appropriate number of charge cable devices is connected to each other according to the number of vehicles. Thus, expandability or scalability is high. Furthermore, multiple charge cable devices are connected to each other as needed, the total length of the charge cable devices is minimized since unused charge cable device is not connected. Thus, since multiple charge cable devices are preliminarily connected to multiple vehicles, it is not necessary to switch the charge cable device from a vehicle to another vehicle every time the charge of the vehicle is completed. Thus, convenience is improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
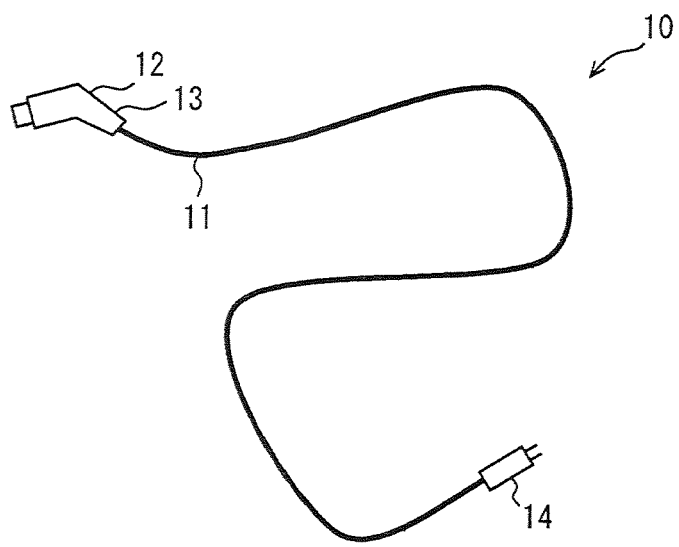
FIG. 1 is a diagram showing a charge cable device according to a first embodiment.
Figure 2:
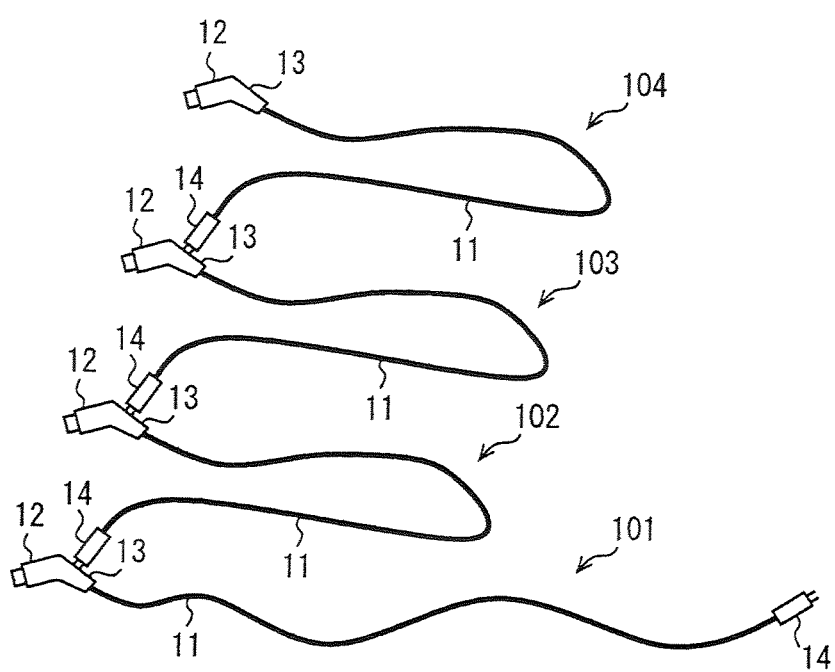
FIG. 2 is a diagram showing multiple charge cable devices.
Figure 3:
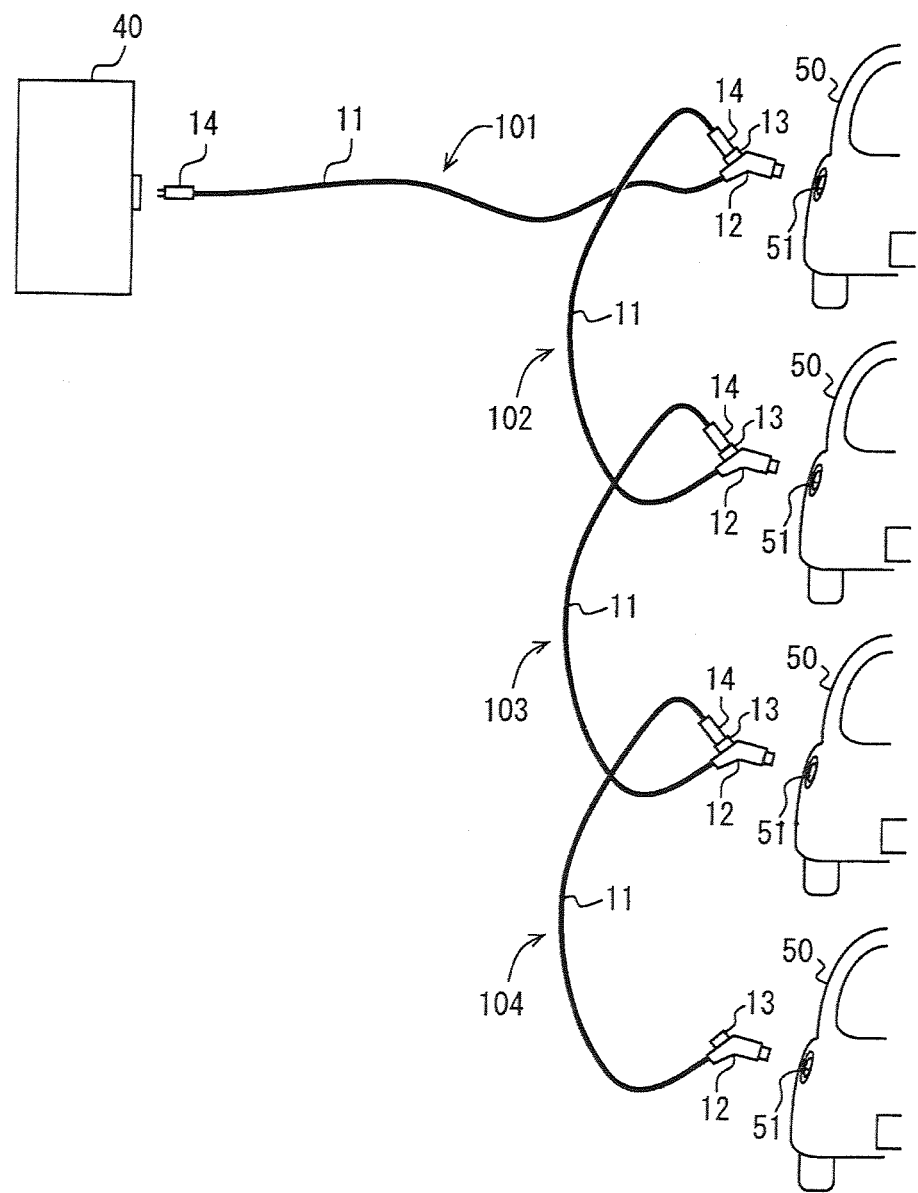
FIG. 3 is a diagram showing a charging state of the charge cable device charging multiple vehicles.

A charge cable device according to a first embodiment will be explained as follows with reference to FIGS. 1 to 6. As shown in FIG. 3, a charge cable device 10 supplies electricity from a charge station as an electric power source to a vehicle 50 such as an electric vehicle and a plug-in hybrid vehicle, which includes a motor as a driving force source, when a battery mounted on the vehicle 50 is charged. As shown in FIGS. 1 and 2, the charge cable device 10 includes a cable 11 connecting to the charge station 40, a charge gun 12 arranged at a top end of the cable 11, and a connector (i.e., cable connector) 13 to be connected to another charge cable device 10.

The cable 11 has the top end, at which the charge gun 12 is attached, and another end, at which a connector plug 14 is arranged. The connector plug 14 is electrically and mechanically detachable with the charge station 40 and the connector 13 of another charge cable device 10. As shown in FIG. 1, the cable 11 has a sufficient length to connect between the charge stand 40 and a charge inlet 51 of the vehicle 50 even when a position of the charge inlet 51 of the vehicle is different among various types of vehicles and a parking position and a parking direction of the vehicle 50 with respect to the charge station 40.

The charge gun 12 functions as a charge connector so that the charge gun 12 is inserted into the charge inlet 51 of the vehicle 50. Thus, the charge gun 12 is electrically connected to the vehicle 50. The gun 12 has a shape, which is suitable for a user to grip the gun 12. The shape of the gun 12 is, for example, a columnar shape. In the present embodiment, the shape of the gun 12 is a gun type shape. The charge station 40 includes a gun holder (not shown) for accommodating the charge gun 12. The gun holder includes a concavity, which is concaved to an inside of the gun holder. The user puts the charge gun 12 in the gun holder after the user finishes charging the vehicle 50. Thus, the charge gun 12 is put in the charge station 40.

The connector 13 is detachable with the connector plug 14 of another charge cable device 10. As shown in FIG. 1, the connector 13 is integrally formed with the charge gun 12, and the connector 13 is a part of the charge gun 12. Thus, the connector 13 is disposed on top end of the cable 11. As shown in FIG. 2, when the connector 13 is connected to the connector plug 14 of another charge cable device 10, multiple charge cable devices 10 are connected to each other in a daisy chain manner. Thus, as shown in FIG. 3, even when the vehicle 50 is disposed far from the charge station 40, so that only one charge cable device 10 can not connect between the station 40 and the vehicle 50, multiple charge cable devices 10 connected in series to each other can supply electricity to the vehicle 50. In FIG. 3, four charge cable devices 10 are connected in series with each other, and the station 40 supplies electricity to four vehicles 50 in turn.

Here, the nearest charge cable device 10 from the station 40 is defined as a first charge cable device 101. The second nearest charge cable device 10 from the station 40 is defined as a second charge cable device 102. The third nearest charge cable device 10 from the station 40 is defined as a third charge cable device 103. The fourth nearest charge cable device 10 from the station 40 is defined as a fourth charge cable device 104.

The charge station 40 is disposed on an outside of a building or a house. The charge station 40 is connected to a charge electric power line, which is divided from an alternating current electric power line by a distribution board. The charge electric power line is arranged in the station 40. Specifically, the connector plug 14 of the cable 11 is connected to a main body of the station 40.

Figure 4:
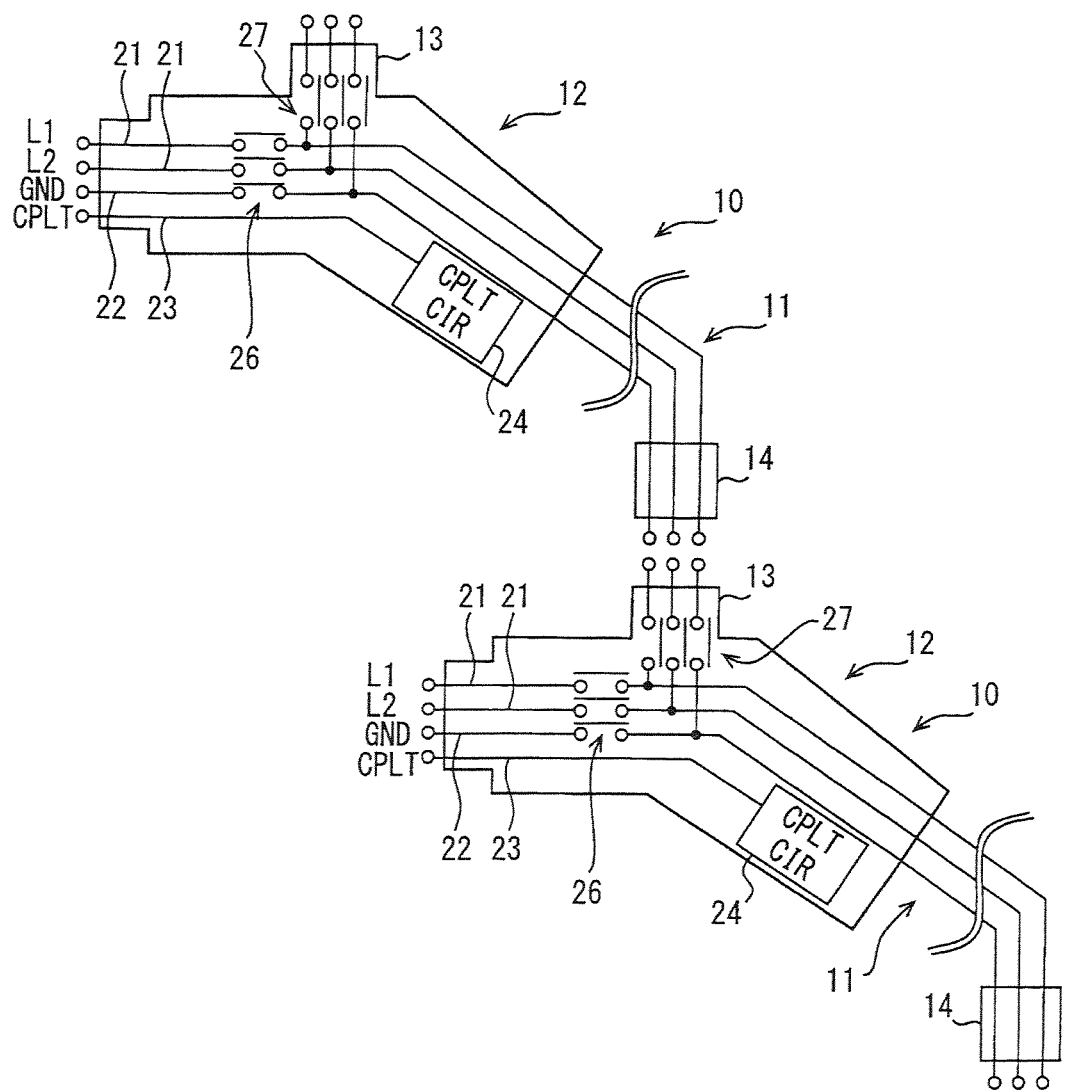
FIG. 4 is a diagram showing an electric construction of a charge plug and a connection part.
Figure 5:
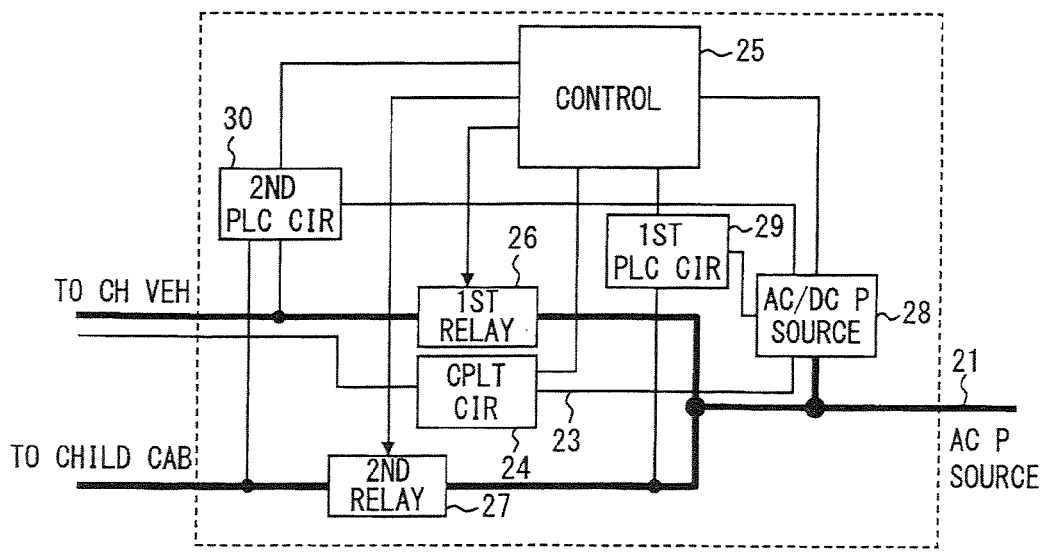
FIG. 5 is a block diagram showing a circuit construction of the charge plug and the connection part.

The construction of the charge gun 12 will be explained with reference to FIGS. 4 and 5. As shown in FIG. 4, a CPLT circuit 24 is built in the gun 12. In FIG. 4, the electric power line 21 and a ground line 22 are shown mainly. FIG. 5 is a block diagram showing a control portion (i.e., controller) 25, which is not shown in FIG. 4.

As shown in FIG. 4, the electric power line L1, L2 and the ground line 22 are disposed in the cable 11. The electric power line 21, a CPTL line 23 and the ground line 22 are disposed in the charge gun 12 so that a CPLT signal as a control pilot signal is transmitted through the lines 21, 23, 22. The CPLT circuit 24 has a function for controlling a charge process to the vehicle 50. The CPLT signal is a well known signal for notifying the rated current of the charge cable device 10 from the CPLT circuit 24. The CPLT circuit 24 is communicated with the control portion 25 via a communication standard RS.

Each of the electric power line 21 and the ground line 22 is divided at the inside of the charge gun 12 into a top end side and a connector side. A first relay 26 and a second relay 27 for switching a connection state of the ground line 22 and the electric power line 21 are arranged on the electric power line 21 and the ground line 22 after they are divided. The first relay 26 is disposed between the branch point of the ground line 22 and the electric power line 21 and the top end of the gun 12. The second relay 27 is disposed between the branch point and the connector 13. When the electricity is not supplied, the first relay 26 is opened so that the first relay 26 blocks current, and the second relay 27 is closed so that the second relay passes current. As described above, the connector plug 14 of another charge cable device 10 is connectable with the connector 13.

Next, the electric construction of the charge gun 12 will be explained with reference to FIG. 5. A CCID (charging circuit interrupt device) is built in the charge gun 12. Specifically, an AC/DC power source 28, a first PLC circuit 29, a second PLC circuit 30, the first relay 26, the second relay 27, the CPLT circuit 24 and the control portion 25 are built in the charge gun 12. The AC/DC power source 28 is connected to the electric power line 21 so that the AC/DC power source 28 converts an alternating current from the electric power line 21 to a direct current, and the source 28 supplies the electricity to the first PLC circuit 29, the second PLC circuit 30, the CPLT circuit 24 and the control portion 25.

The electric power line 21 is branched at the middle of the line 21, and the first relay 26 is arranged on a part of the electric power line 21 on the top end side of the gun 12. The second relay 27 is arranged on another part of the electric power line 21, which is to be connected to the connector 13. The CPLT circuit 24 is controlled by the control portion 25 so that the CPLT circuit 24 communicates with the vehicle 50. Thus, the CPLT circuit 24 monitors the charge state of the vehicle 50.

Each PLC circuit 29, 30 communicates with the vehicle 50 via the electric power line 21 in the cable 11. The PLC is referred as a connector LAN, a power line transfer communication, or a power line communication. In the present embodiment, the PLC is referred as the power line communication. Specifically, the PLC is a communication technique for putting an information signal on the electric power line 21, which sends electricity. The PLC network is established by utilizing an existing electric wiring without additional construction. Each PLC circuit 29, 30 communicates with the control portion 25 via a UART (universal asynchronous receiver transmitter) method for performing an asynchronous (start-stop synchronous) serial communication. The first PLC circuit 29 transmits and receives information via the electric power line 21 from the connector plug 14. The second PLC circuit 30 transmits and receives information via the electric power line 21 after the line is branched.

The control portion 25 controls the first relay 26, the second relay 27 and the CPLT circuit 24 based on the information from the first PLC circuit 29. Further, the control portion 25 communicates with another charge cable device 10 disposed on the charge station side and the charge station 40 via the first PLC circuit 29. Further, the control portion 25 communicates with another charge cable device 10 on the connector side via the second PLC circuit 30. When the connector plug 14 is energized, the control portion 25 is activated. Thus, under a condition that the connector plug 14 is energized, the control portion 25 continues to be activated.

Thus, when the connector 13 is connected to another charge cable device 10, each PLC circuit 29, 30 functions as a repeating element for correcting degradation of a waveform of the communication signal and for sending a corrected communication signal again. Accordingly, the control portion 25 executes a protection process for protecting received information from degradation, and then, the portion 25 sends the information to another charge cable device 10. Thus, when the portion 25 receives information from another charge cable device 10, and sends the information to further another charge cable device 10, the portion 25 prevents the received information from a change, which is caused by degradation attributed to wire communication. Accordingly, even when multiple charge cable devices 10 are connected to each other so that a total length of the devices 10 is extended, charge cable devices 10 on both ends can be communicated with each other. When the control portion 25 communicates with another charge cable device 10, and a current capacity of another charge cable device 10 connected to the connector 13 excesses a threshold, the control portion 25 controls the second relay 27 to switch off (i.e., be opened).

Figure 6:
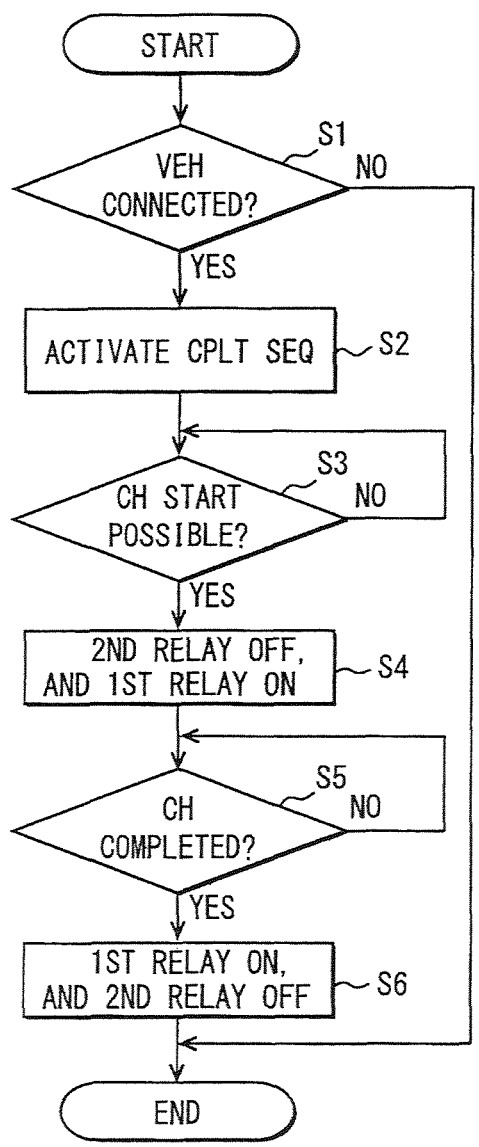
FIG. 6 is a flowchart showing a charge control process of a controller.

Next, a charge control process of the control portion 25 will be explained with reference to FIG. 6. The process shown in FIG. 6 is executed by each control portion 25, which is connected in series with each other. Before the electricity is supplied to the control portion 25, the first relay 26 is opened, i.e., turns off, and the second relay 27 is closed, i.e., turns on. The process in FIG. 6 is repeatedly executed for a short time under a condition that the electricity is supplied to the control portion 25.

When the control portion 25 starts executing the charge control process in FIG. 6, in step S1, the control portion 25 determines whether the charge gun 12 is connected to the vehicle 50. When the charge gun 12 is connected to the vehicle 50, it goes to step S2. When the charge gun 12 is not connected to the vehicle 50, the process ends.

In step S2, the portion 25 controls the CPLT circuit 24 to activate a CPLT sequence. Then, it goes to step S3. When the CPLT sequence is activated, the vehicle 50 starts to communicate with the control portion 25 via the CPLT provided by the CPLT circuit 24.

In step S3, based on a result of communication with the vehicle 50, the control portion 25 determines whether it is possible to start charging (i.e., whether the charging start is possible). When the starting of charge is possible, it goes to step S4. When the starting of charge is not possible, the portion 25 repeats step S3 until the starting of charge becomes possible.

In step S4, since the charging start is possible, the portion 25 controls the first relay 26 to be closed (i.e., to turn on) and the second relay 27 to be opened (i.e., to turn off). Then, it goes to step S5. Thus, the charge gun 12 is connected to the vehicle 50 so that the gun 12 is capable of supplying electricity to the vehicle 50. The gun 12 starts to charge the vehicle 50.

In step S5, the control portion 25 determines whether the charge of the vehicle 50 is completed. When the charge of the vehicle 50 is completed, it goes to step S6. When the charge of the vehicle 50 is not completed, the portion 25 repeats step S5 until the charge of the vehicle 50 is completed. The portion 25 determines based on the waveform of the CPLT signal whether the charge of the vehicle is completed. Alternatively, the portion 25 determines the completion of the charge according to the voltage of the CPLT signal and/or the AC current value.

In step S6, since the charge of the vehicle 50 is completed, the portion 25 controls the first relay 26 to turn off and the second relay 27 to turn on. Then, the portion 25 ends the charge control process.

The control portion 25 stops supplying electricity to other cables 11 when the station 40 charges the vehicle 50. After a predetermined charge completion condition for charging the vehicle 50 is satisfied, the portion 25 controls electric power supply amount to each cable 11 so as to supply electricity to other cables 11. The charge completion condition in the charge control process is to fully charge the vehicle 50. Alternatively, the charge completion condition may be to charge the vehicle up to a predetermined charge amount. Alternatively, the charge completion condition may be set by predetermined charge time. Accordingly, for example, the control portion 25 may control the charge gun 12 so as to change the electricity supply object after predetermined time has elapsed. The predetermined time is set by a user, and the charge gun 12 includes a timer function. Alternatively, the control portion 25 may change the electricity supply object when the charge amount of the vehicle 50 reaches a predetermined value.

When the connector 13 connects to another cable 11, and the charge gun 12 is not attached to the charge inlet 51, the control portion 25 may control each electricity supply amount such that the control portion 25 stops supplying the electricity to the charge gun 12, and starts to supply the electricity to another cable 11. Specifically, when the charge gun 12 disposed at the middle point of the cables 11, which are connected in series with each other (i.e., connected in a daisy chain manner), is not connected to another vehicle 50, the control portion 25 skips to supply the electricity to the gun 12 at the middle point, and starts to supply the electricity to other guns 12, which are disposed on the top end side. Thus, the daisy-chain connected cables 11 provide merely an extended cable.

Thus, the charge cable device 10 according to the present embodiment includes the connector 13 for electrically connecting between other cables 11 and the electric power line 21 when the cable 11 in another charge cable device 10 is attached. Accordingly, multiple charge cable devices 10 functions as an extended cable. When the connector 13 is connected to another cable 11, the control portion 25 controls the electric power supply amount to the gun 12 from the charge station 40 as the electricity supply source and the electric power supply amount to another cable 11 attached to the connector 13 from the station 40 via the connector 13. Accordingly, the electricity is supplied to another cable 11 connected to the connector 13 from the station 40. Thus, when multiple charge cable devices 11 are connected to each other according to the number of vehicles 50 to be charged, the charge station 40 is electrically connected to each vehicle 50 at the same time. Accordingly, the number of charge cable devices 10 to be connected to each other is determined by the number of vehicles 50 to be charged, and therefore, expandability or flexibility of the device 10 is improved. Further, since multiple charge cable devices 10 are connected if necessary, a total length of the cables 11 is not unnecessarily long, and excess charge cable devices 10, which are not utilized, are not connected. Thus, when multiple vehicles 50 are charged, it is not necessary to switch the charge gun 12 to another vehicle every time the charge is completed. The convenience of the device 10 is improved.

In the present embodiment, when the connector 13 connects to another cable 11, the control portion 25 controls the electricity supply amount of each vehicle 50 according to a predetermined priority. In the present embodiment, when the charge gun 12 is connected to the vehicle 50, the charge via the charge gun 12 is prioritized until the charge is completed. After the charge of the gun 12 is completed, the electricity is supplied to the connector 13. Accordingly, the vehicle 50 on the charge station side has high priority. Thus, the user arranges the vehicle 50 on the charge station side according to the required priority, so that the vehicles 50 are charged in turn. Further, since the vehicle 50 on the charge station side is prioritized, when the number of vehicles 50 to be charged is one, the vehicle 50 is charged with using only one charge cable device 10. Thus, the connection between the vehicle 50 and the station 40 is simplified.

Further, in the present embodiment, the control portion 25 stops supplying the electricity to another cable 11 when the station 40 charges the vehicle 50. When the charge completion condition for charging the vehicle 50 is satisfied, the portion 25 controls the electricity supply amount of each vehicle 50 so as to supply electricity to another cable 11. Thus, the charge completion condition for charging the vehicle 50 is satisfied in order of the vehicles 50 from the station side to the top end side.

In the present embodiment, when the connector 13 is connected to another cable 11, and the charge gun 12 is not attached to the charge inlet 51, the control portion 25 stops supplying electricity to the charge gun 12. Then, the control portion 25 controls the electricity supply amount to each vehicle 50 so as to supply electricity to another cable 11. Accordingly, the connected charge cable devices 10 provide merely an extended cable. Thus, even when only one charge cable device 10 is not connected between the vehicle 50 and the station 40 because of the position of the vehicle 50, multiple charge cable devices 10 are connected in series with each other so as to connect between the vehicle 50 and the station 40, so that the devices 50 can be extended to a desired position.

In the present embodiment, since multiple charge cable devices 10 are connected in the daisy chain manner, if multiple vehicles 50 are arranged in line, the vehicles 50 can be charged in turn. In this case, if one vehicle 50 can be parked near the station 40, the vehicles 50 are capable of being charged sufficiently. The number of vehicles 50 to be connected to each other via the devices 10 may be changeable. The connection feature of the vehicles 50 via the devices 10 is realized according to the arrangement of the vehicles 50, which are arranged appropriately. Thus, it is not necessary to change the length of the cable 11. Even when the vehicles 50 are arranged horizontally, each vehicle 50 is charged. Specifically, the number of vehicles 50 can be increased with multiple charge cable devices 10, each of which has the same structure. Since the charge cable devices 10 has the same structure, sufficient expandability or flexibility is achieved with minimum cost.

Further, the charge cable device 10 according to the present embodiment matches the utility form of vehicles 50. For example, since the vehicles 50 are arranged horizontally in general, the charge cable devices 10 connect between the vehicles 50, which are arranged in line. Accordingly, the charge cable devices 10 are suitably used for a case where the vehicles 50 are managed in a fleet, for example, in a taxi company or a company having multiple commercial vehicles.

Second Embodiment

Next, the charge cable device according to a second embodiment will be explained with reference to FIG. 7. In the present embodiment, in the charge cable device 10A, the charge gun 12A and the connector 13A are independent bodies.

Figure 7:
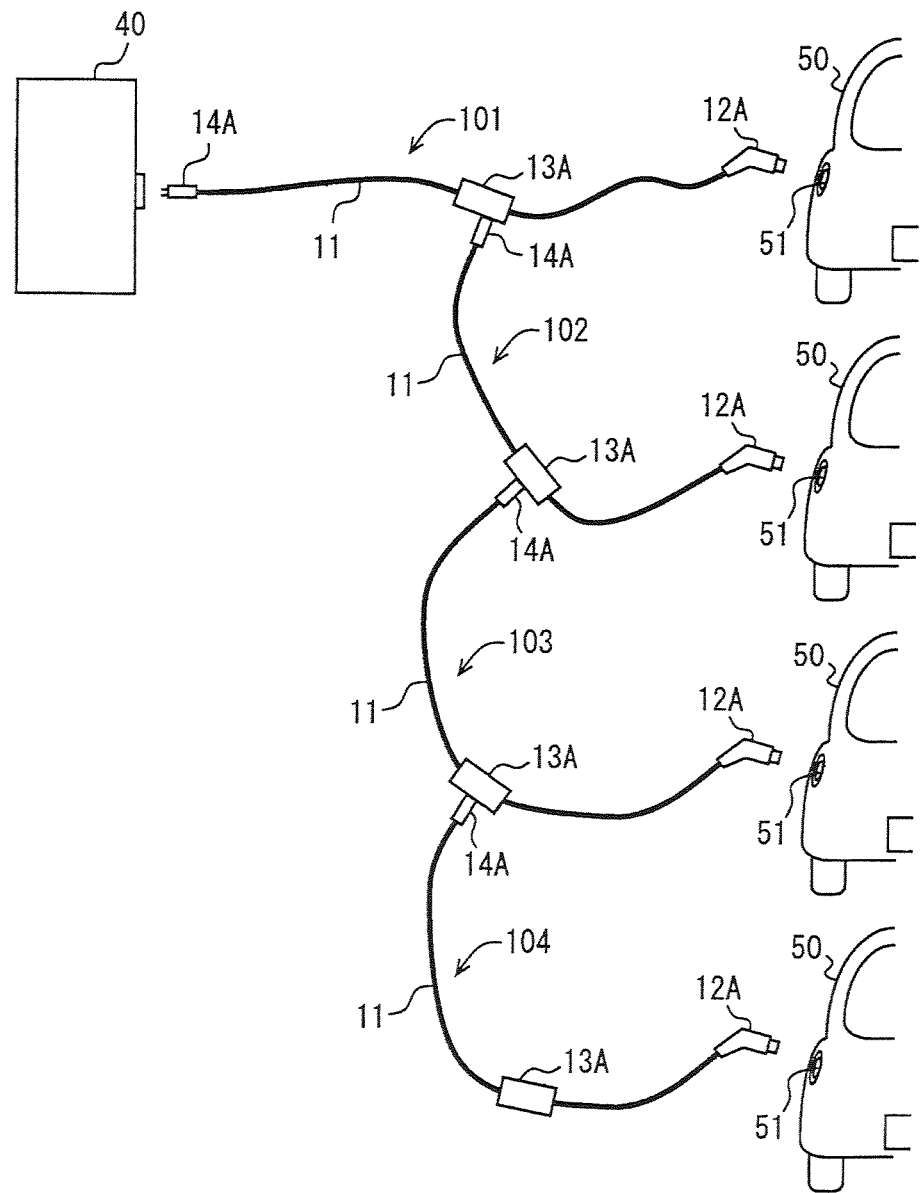
FIG. 7 is a diagram showing multiple charge cable devices according to a second embodiment.

As shown in FIG. 7, the charge gun 12A and the connector 13A are separately formed. The connector 13A is disposed at the middle of the cable 11. Accordingly, the connector plug 14A of another charge cable device 10A is connected to the connector 13A at the middle of the cable 11, which is disposed on the connector plug side of the cable 11 compared with the first embodiment.

In the first embodiment, the CCID is built in the charge gun 12, and the CCID controls the relays 26, 27 to switch on and off. Alternatively, the box of the CUD as the connector 13A may be disposed at the middle of the cable 11. Further, a socket, in which the connector plug 14A is inserted, may be arranged in the box.

Next, the charge cable device according to a third embodiment will be explained with reference to FIG. 8. In the present embodiment, the charge cable device 10B includes the charge gun 12B having a construction different from the first embodiment.

Figure 8:
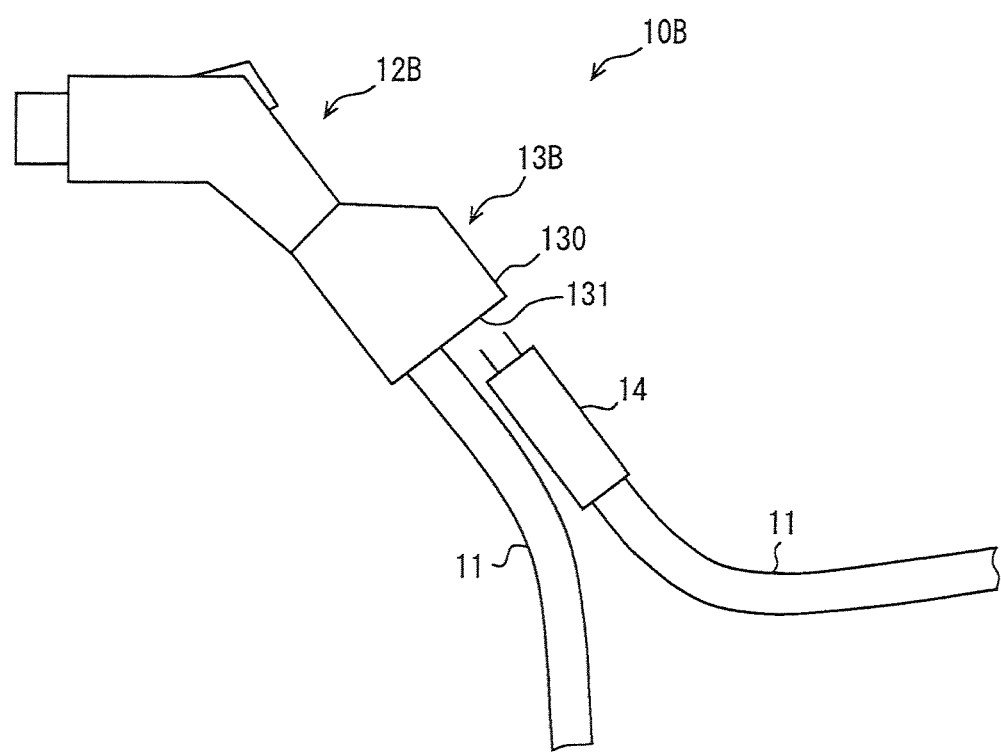
FIG. 8 is a diagram showing a partially-enlarged view of a charge cable device according to a third embodiment.

As shown in FIG. 8, the connector 13B built in the charge gun 12B has a connection structure 130 such that the connector plug 14 of another cable 11 is inserted into the connector 13B along an upward direction. Under a condition that the charge gun 12B is attached to the charge inlet 51 of the vehicle 50, as shown in FIG. 8, the connector plug 14 of another cable 11 is inserted into the connector 13B in a direction from a lower side to an upper side. Further, the connector 13 includes a cover 131 for covering the outside of the connection structure 130. The cover 131 extends from the connection structure 130 to the lower side. Accordingly, when the connector plug 14 of another cable 11 is inserted in the connector 13B upwardly, the cover 131 protects the connection structure 130 from rain water, which may enter the connection structure 130.

Fourth Embodiment

A charge cable device according to a fourth embodiment will be explained with reference to FIGS. 9-14. In the charge cable device 10 according to the present embodiment, the construction of the first charge cable device 101C is different from the first charge cable device 101 according to the first embodiment. In the present embodiment, when the connector 13 is connected to another cable 11, the control portion 25 controls the electricity supply amount of each vehicle 50 according to a predetermined priority. Further, in the present embodiment, the display 61 for notifying the priority is arranged on the charge gun 12. Thus, the display 61 functions as a notifying device.

Figure 9:
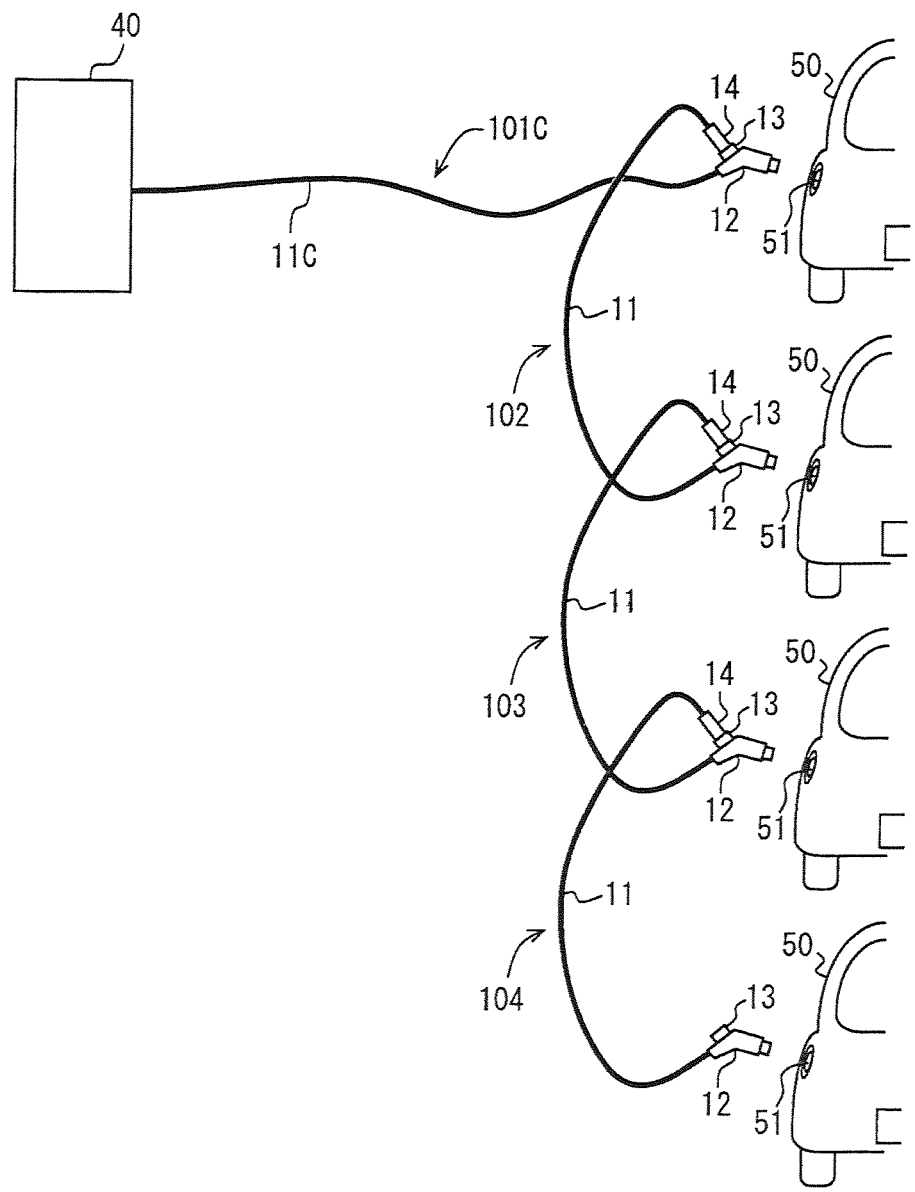
FIG. 9 is a diagram showing multiple charge cable devices according to a fourth embodiment.

As shown in FIG. 9, the first charge cable device 101C is physically attached to the charge station 40 so that the cable 11C can not separate from the station 40. Specifically, one end of the cable 11C is mechanically and electrically fixed to the station 40. Accordingly, the first charge cable device 101C attached to the station 40 is not detachable from the station 40. The second to fourth charge cable devices 102-104 have the same structure as the first embodiment.

Next, one example of the priority will be explained. A first example of the priority is such that a parent cable 11 disposed on the station side is in priority to a child cable 11 disposed on the top end side so that the vehicle 50 connected to the parent cable 11 is charged in priority to the vehicle 50 connected to the child cable 11. The child cable 11 is connected to the connector 13 of the parent cable 11. Thus, the nearer the station 40, the higher the priority.

Figure 10:
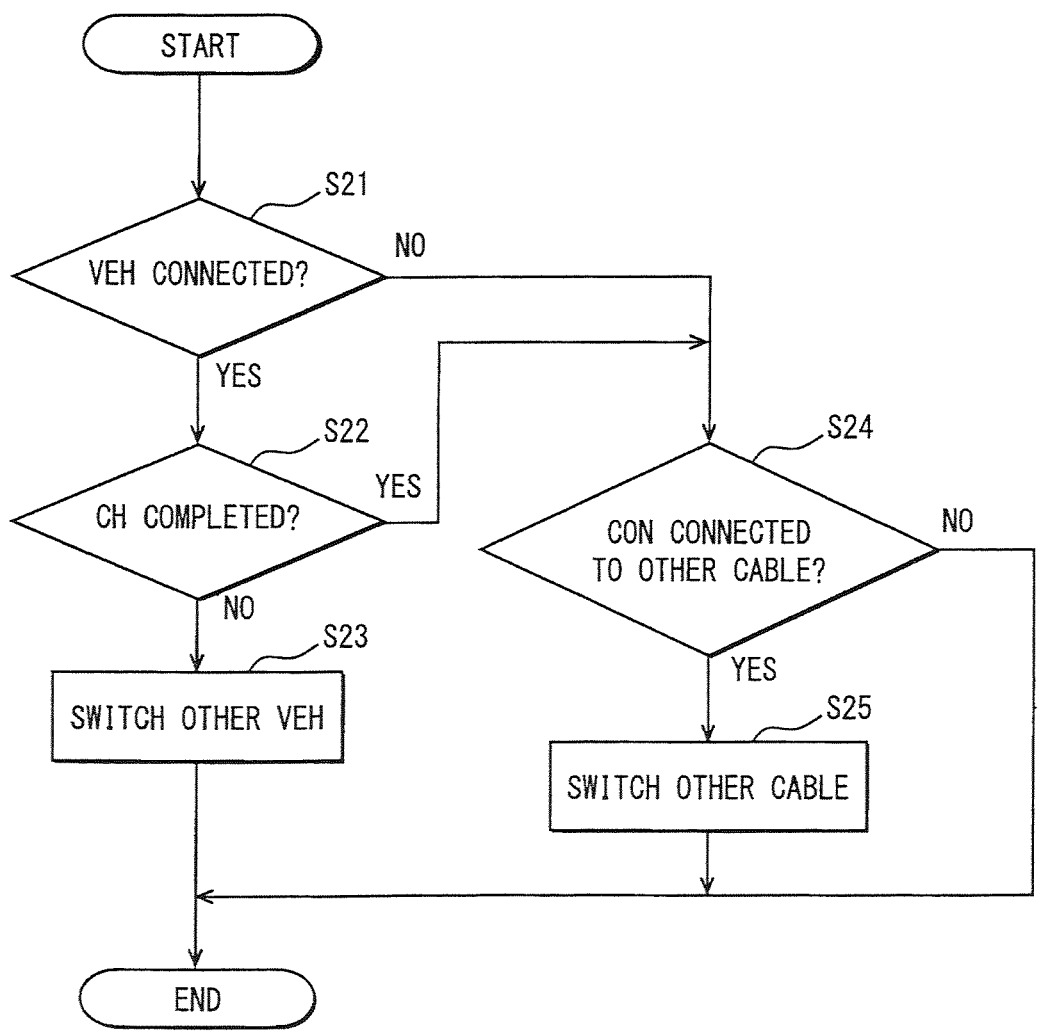
FIG. 10 is a flowchart showing a control process for prioritizing a mother cable according to the fourth embodiment.

The process in FIG. 10 shows a control process for the priority of the parent cable 11. The process in FIG. 10 is repeated for a short time under a condition that the control portion 25 is energized.

At step S21, the portion 25 determines whether the charge gun 12 is connected to the vehicle 50. When the vehicle 50 is connected to the charge gun 12, it goes to step S22. When the vehicle 50 is not connected to the charge gun 12, it goes to step S24. At step S22, the portion 25 determines whether the charge of the vehicle 50 connected to the gun 12 is completed. When the charge is completed, it goes to step S23. When the charge is not completed, it goes to step S24. At step S23, since the charge is not completed, the portion 25 controls the first relay 26 to supply electricity to the vehicle 50. Then, the portion 25 ends the process.

At step S24, since the vehicle 50 is not connected to the gun 12, or since the charge is not completed, the portion 25 determines whether the connector 13 is connected to another charge cable device 10. When the connector 13 is connected to another charge cable device 10, it goes to step S25. When the connector 13 is not connected to another charge cable device 10, the portion 25 ends the process. At step S25, the portion 25 controls the second relay 27 to supply electricity to the connector 13. Then, the portion 25 ends the process.

As shown in FIG. 10, when the charge gun 12 is connected to the vehicle 50, the portion 25 prioritizes the charge of the vehicle 50, i.e., the portion 25 prioritizes the parent cable 11. When the charge is completed, the portion 25 controls to supply electricity to another cable 11. Specifically, the priority is determined based on the order of vehicles 50 connected to the station from the station side so that the charge cable device 10, which is connected to the station 40 and disposed nearer the station 40, has higher priority. Thus, the priority is determined with simple control method.

Next, a second example of the priority will be explained as follows. The second example of the priority is such that the child cable 11 disposed on the top end side is in priority to the parent cable 11 disposed on the station side so that the vehicle 50 connected to the child cable 11 is charged in priority to the vehicle 50 connected to the parent cable 11. Thus, the farther from the station 40, the higher the priority.

Figure 11:
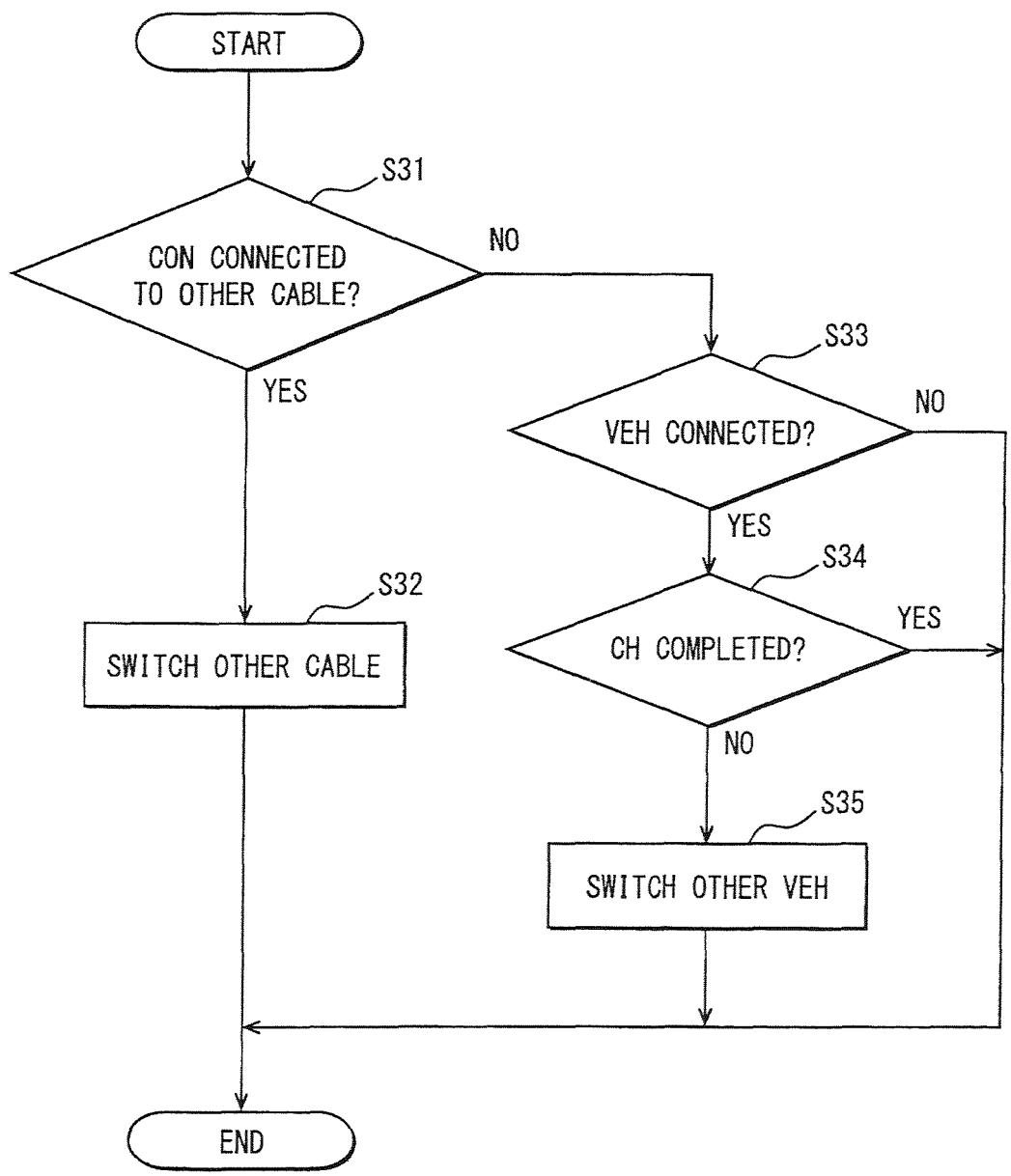
FIG. 11 is a flowchart showing a control process for prioritizing a child cable according to the fourth embodiment.

The process in FIG. 11 shows a control process for the priority of the child cable 11. The process in FIG. 11 is repeated for a short time under a condition that the control portion 25 is energized.

At step S23, the portion 25 determines whether the connector 13 is connected to another cable 11. When the connector 13 is connected to another cable 11, it goes to step S32. When the connector 13 is not connected to another cable 11, it goes to step S33. At step S32, the portion 25 controls the second relay 27 to supply electricity to the connector 13. Then, the portion 25 ends the process.

At step S33, the portion 25 determines whether the charge gun 12 is connected to the vehicle 50. When the charge gun 12 is connected to the vehicle 50, it goes to step S34. When the charge gun 12 is not connected to the vehicle 50, the portion 25 ends the process.

At step S34, the portion 25 determines whether the charge of the vehicle 50 connected to the gun 12 is completed. When the charge is completed, the portion 25 ends the process. When the charge is not completed, it goes to step S35. At step S35, since the charge is not completed, the portion 25 controls the first relay 26 to supply electricity to the vehicle 50. Then, the portion 25 ends the process.

As shown in FIG. 11, when the connector 13 is connected to another cable 11, the portion 25 prioritizes the charge through another cable 11, i.e., a child cable 11. When the charge is completed, the portion 25 charges the vehicle 50 connected to the parent cable 11. Specifically, the priority is determined based on the order of vehicles 50 connected to the station from the top end side so that the charge cable device 10, which is connected to the station 40 and disposed farther from the station 40, has higher priority. Thus, the priority is determined with simple control method.

Figure 12:
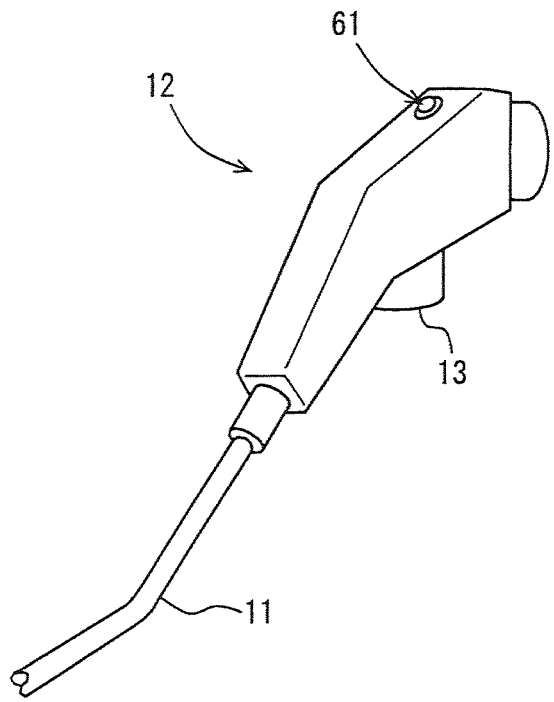
FIG. 12 is a diagram showing a perspective view of a charge plug having a first display unit.
Figure 13:
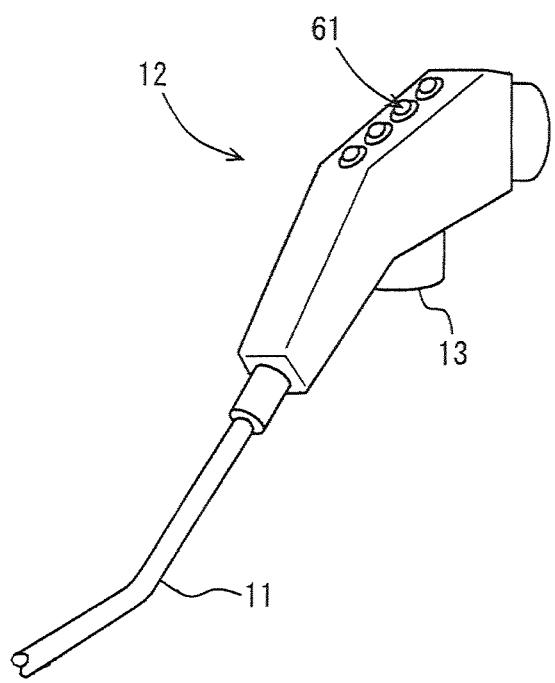
FIG. 13 is a diagram showing a perspective view of a charge plug having a second display unit.
Figure 14:
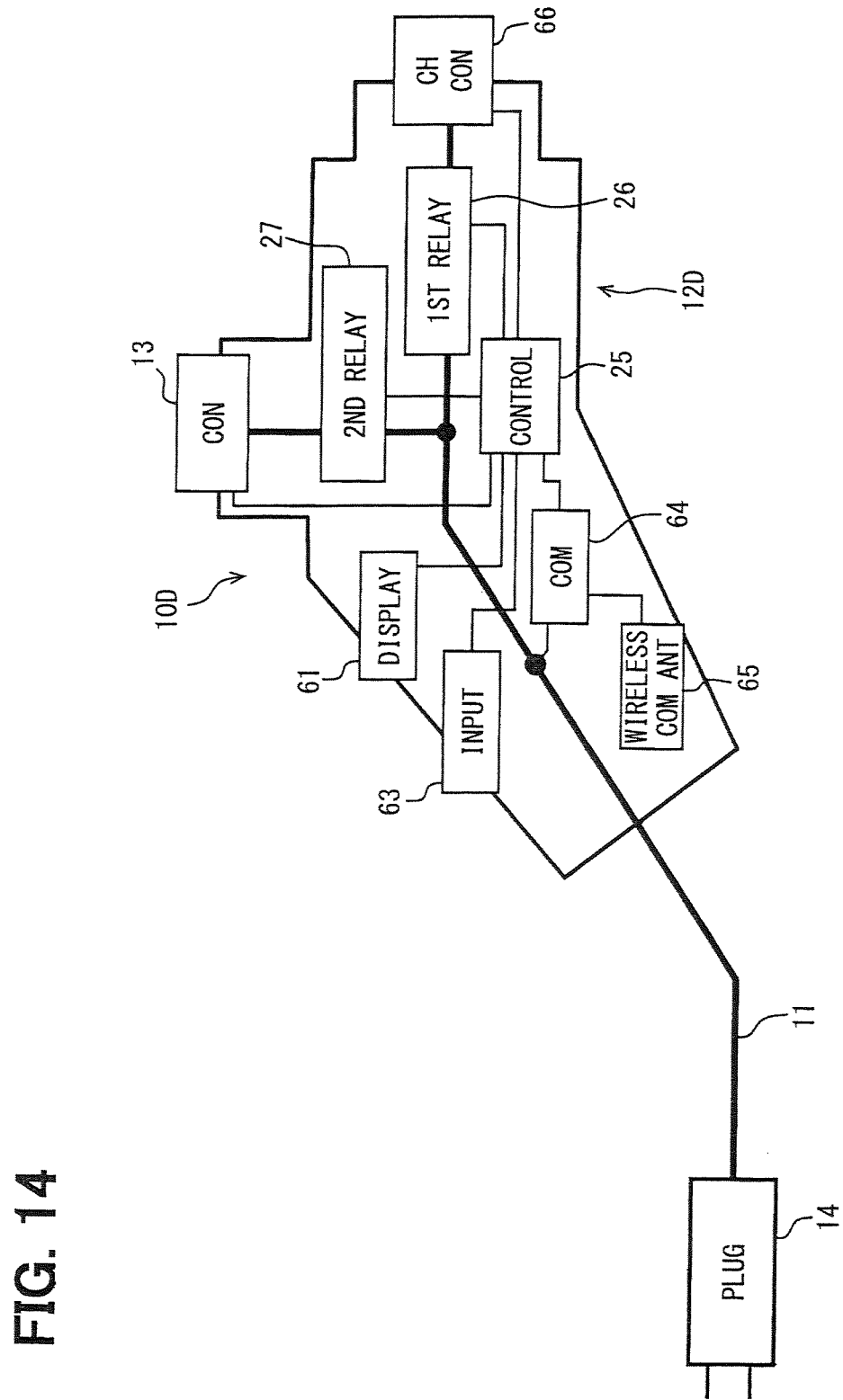
FIG. 14 is a diagram showing a simplified view of an electric construction of a charge plug and a connection part according to a fifth embodiment.
Figure 15:
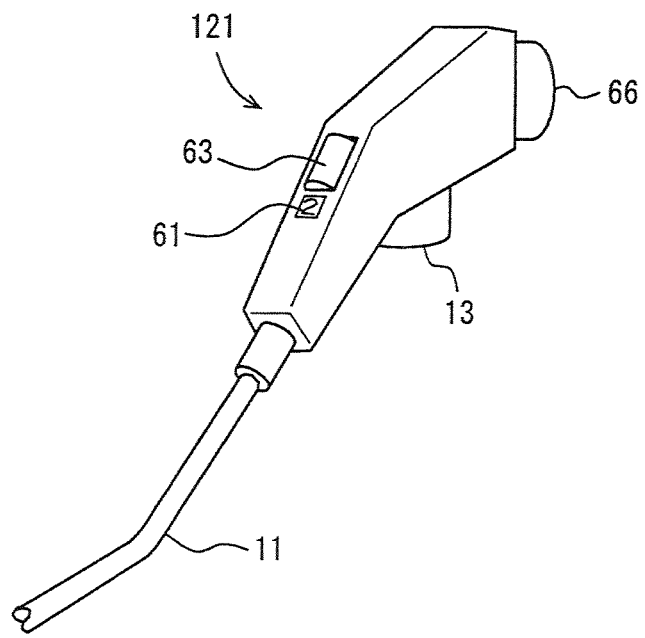
FIG. 15 is a diagram showing a perspective view of a first charge plug.

Next, the display 61 will be explained with reference to FIGS. 12 and 13. As shown in FIGS. 12 and 13, the display 61 is provided by a LED (light emitting device) or the like for emitting light. In FIG. 12, the display 61 includes one LED, and in FIG. 13, the display 61 includes multiple LEDs.

FIG. 12 shows only one LED in order to simplify the construction of the display 61. Accordingly, the priority is notified by changing a blinking speed and/or a light color. For example, when the blinking speed is high, i.e., blinking interval is short, the priority is high. In FIG. 13, the display 61 includes four LEDs. For example, when the number of lighted LEDs is large, the priority is high. Thus, since the device 10 includes the display for notifying the priority, the user can confirm the priority of the charge cable devices 10.

Further, in addition to the priority, the display 61 may notify other information. For example, when a certain error occurs, for example, when the communication error occurs, the device 10 may diagnose the error, and the display 61 notifies the error.

Fifth Embodiment

A charge cable device according to a fifth embodiment will be explained with reference to FIGS. 14-20. The charge cable device 10D according to the present embodiment further includes an input portion 63, a display 61, a communication portion 64 and a wireless communication antenna 65. Further, the charge gun 12D includes a charge gun connector 66 for electrically connecting to the charge inlet 51.

The input portion 63 and the display 61 are controlled by the control portion 25. The input portion 63 inputs priority information relating to the priority for charging vehicles 50. The input portion 63 is provided by a dial or a switch. The display 61 notifies the priority similar to the fourth embodiment. The display 61 is, for example, provided by a LED and/or a liquid crystal display.

FIGS. 15 to 20 show an example of the charge gun 12D. In the first charge gun 121 shown in FIG. 15, the input portion 63 is provided by a dial, and the display 61 is provided by a liquid crystal display for displaying the number. When the user operates the dial, the priority of the charge gun 121 is set. Further, the number displayed on the display 61 represents the priority. When the number shown in the display 61 is small, the priority is high.

Figure 16:
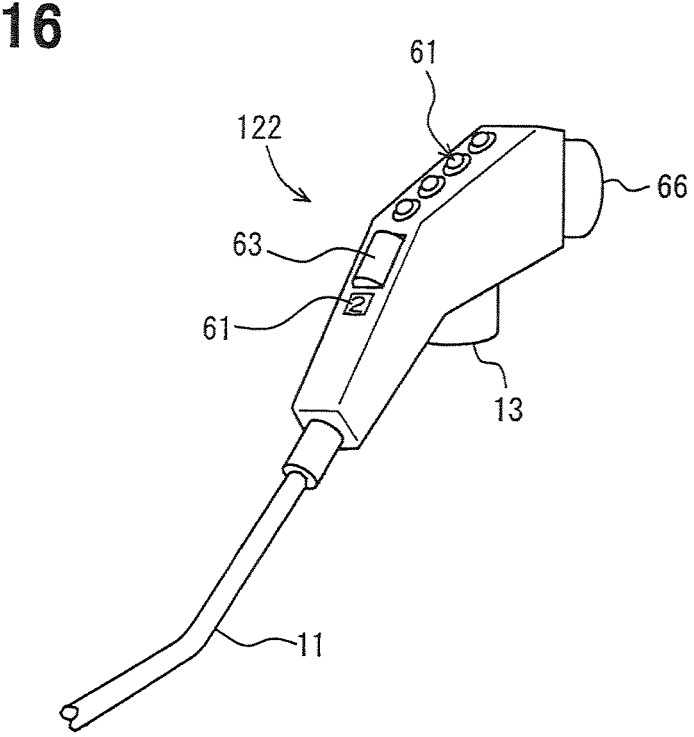
FIG. 16 is a diagram showing a perspective view of a second charge plug.
Figure 17:
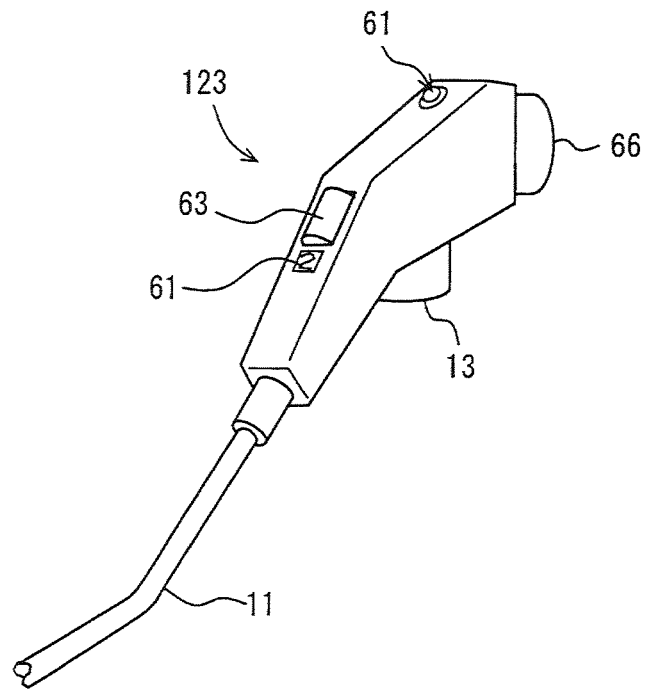
FIG. 17 is a diagram showing a perspective view of a third charge plug.

The second charge gun 122 in FIG. 16 includes the input portion 63 provided by the dial and the display 61 provided by the liquid crystal display for displaying the number and four LEDs. When the number of lighted LEDs is large, the priority of the vehicle 50 is high. The third charge gun 123 in FIG. 17 includes the input portion 63 provided by the dial and the display 61 provided by the liquid crystal display for displaying the number and one LED. When the blinking interval is short, the priority of the vehicle 50 is high.

Figure 18:
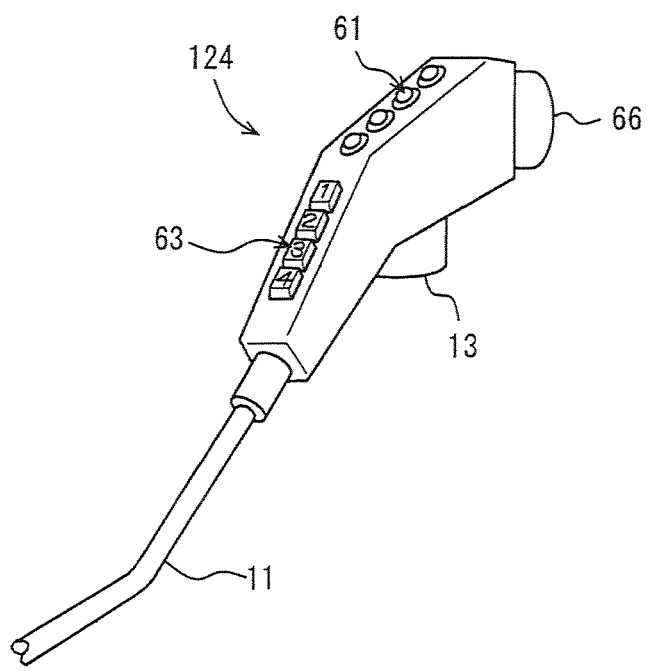
FIG. 18 is a diagram showing a perspective view of a fourth charge plug.
Figure 19:
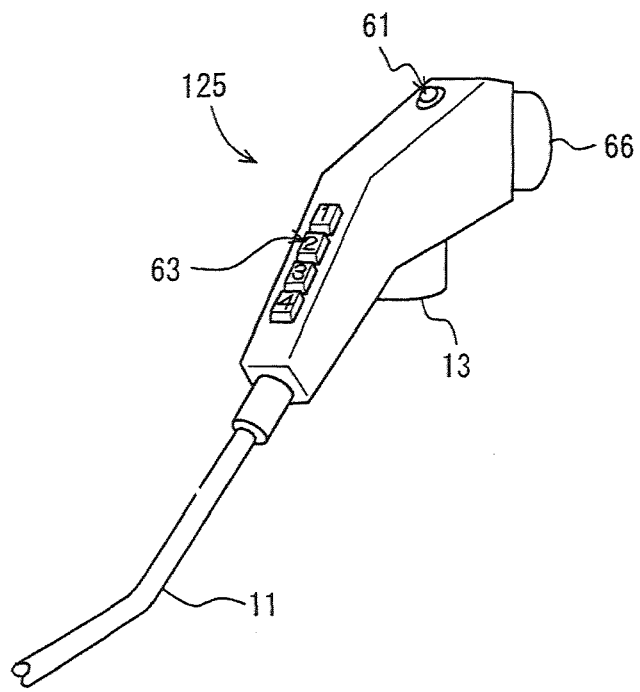
FIG. 19 is a diagram showing a perspective view of a fifth charge plug.
Figure 20:
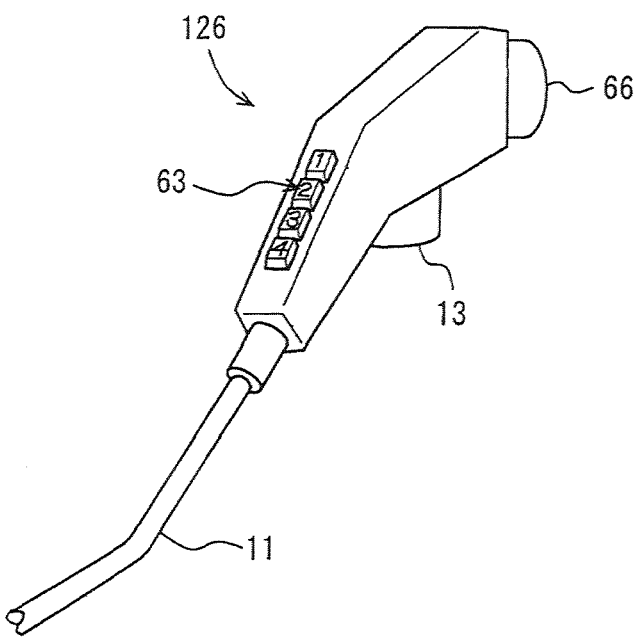
FIG. 20 is a diagram showing a perspective view of a sixth charge plug.

The charge gun 124 in FIG. 18 includes the input portion 63 provided by the switch and the display 61 provided by four LEDs. When the user pushes the switch corresponding to the priority, the user can set the priority of the charge gun 124, which is operated by the user. The fifth charge gun 125 in FIG. 19 includes the input portion 63 provided by the switch and the display 61 provided by one LED. The sixth charge gun 126 in FIG. 20 does not include the display 61 but the input portion 63 provided by the switch.

The communication portion 64 is connected to the electric power line 21 so that the communication portion 64 is energized via the electric power line 21. The communication portion 64 wirelessly communicates with another charge cable device 10D via the wireless communication antenna 65. The wireless communication method is not limited. For example, the wireless communication method may be a wireless LAN system, a Zigbee (which is a registered trademark) system, a Z-WAVE (which is a registered trademark), a Bluetooth (which is a registered trademark) or the like. The communication portion 64 transmits the priority information input by the input portion 63 to another charge cable device 10D. Further, the communication portion 64 receives the priority information from another charge cable device 10D. The control portion 25 sets the priority according to the priority information obtained by the communication portion 64.

Figure 21:
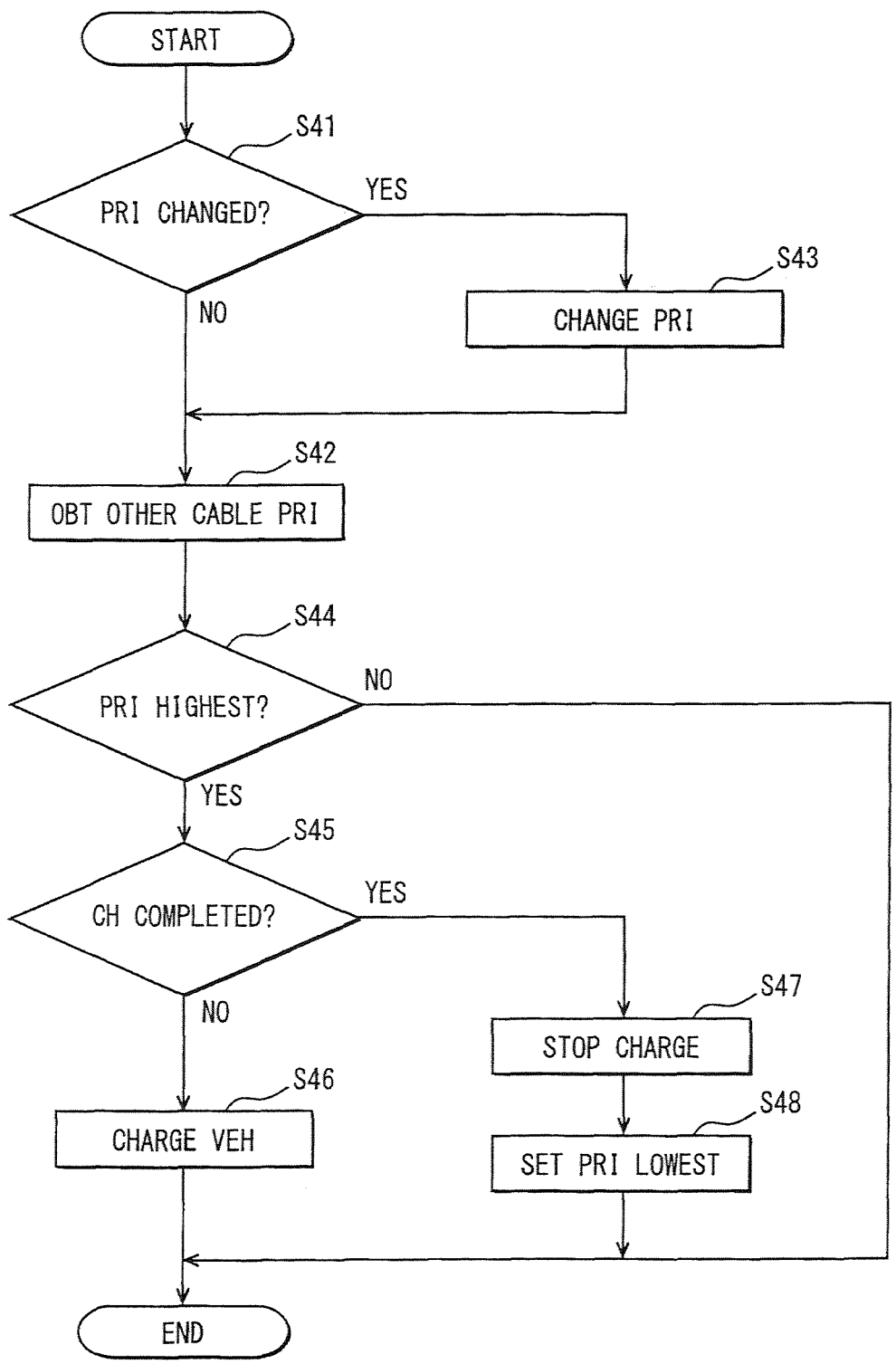
FIG. 21 is a flowchart showing a control process for charging multiple vehicles according to a priority order.

The portion 25 executes repeatedly the process shown in FIG. 21 for a short time under a condition that the electricity is supplied to the control portion 25. Further, in order to supply electricity to all of the communication portions 64 and the control portions 25 of the charge cable devices 10D, the second relays 27 are always controlled to be closed when the electricity is supplied from the connector plugs 14.

At step S41, the portion 25 determines whether the user operates the input portion 63 so that the priority is changed. When the priority is changed, it goes to step S42. When the priority is not changed, it goes to step S43. At step S43, since the priority is changed, the priority information to be transmitted is updated to the latest priority information, and then, it goes to step S42.

At step S42, the priority information is obtained from another charge cable device 10D via the communication portion 64. Then, it goes to step S44. At step S44, based on the received priority information, the portion 25 determines whether the priority of the vehicle 50 relating to the portion 25 is the highest priority. When the priority is the highest priority, it goes to step S45. When the priority is not the highest priority, the portion 25 ends the process.

At step S45, since the priority of the vehicle 50 is the highest priority, the portion 25 determines whether the charge of the vehicle 50 related to the control portion 25 is completed. When the charge is completed, it goes to step S47. When the charge is not completed, it goes to step S46. At step S46, since the charge is not completed, the portion 25 controls the first relay 26 in order to energize the vehicle 50. Then, the portion 25 ends the process.

At step S47, since the charge is completed, the portion 25 stops supplying the electricity to the vehicle 50. Then, it goes to step S48. At step S48, since the charge is completed, the portion 25 sets the priority of the vehicle 50 to be the lowest priority. Thus, the portion 25 ends the process.

Thus, the vehicles 50 are charged in the descending order of the priority, which is input by the input portion 63. Further, when the user changes the priority during the charge to set the priority of another vehicle 50 to be the highest priority, the vehicles are charged according to the changed priority. Thus, the user can charge the vehicles 50 according to a desired order of the user.

Further, multiple input portions 63 of the charge cable devices 10D are operated, the charge cable device 10D having the later operated switch is prioritized. In this case, the priority is given to the last operated device 10D. Alternatively, the priority may be given to the child device 10D.

In a case where the connector 13 is connected to another charge cable device 10D, when a state that the charge gun 12D is not attached to the charge inlet 51 is changed to a state that the charge gun 12D is connected to the charge inlet 51, the control portion 25 may determine that the priority is changed, and control the device 10D according to the changed priority. Accordingly, when a new charge gun 12D is connected, the priority information is updated to latest priority information, and the charge cable devices 10D controls to supply electricity to the vehicles based on the latest priority information. Thus, the convenience is improved without considering the connection order of the vehicles 50.

Sixth Embodiment

A charge cable device according to a sixth embodiment will be explained with reference to FIG. 22. The charge cable device 10 according to the present embodiment determines the priority based on the charge amount of the vehicle 50. The communication portion 64 functions as a information obtaining device for obtaining the vehicle information relating to the vehicle 50, to which the charge gun 12 is attached. Further, the communication portion 64 transmits the obtained vehicle information to another charge cable device 10, and receives the vehicle information relating to another vehicle from another charge cable device 10. The control portion 25 sets the priority according to the obtained vehicle information transmitted to another device 10 and the received vehicle information received from another device 10. The vehicle information includes, for example, battery charge amount, charge completion time, a planned travelling distance and the like. In the present embodiment, the vehicle information includes the battery charge amount.

Figure 22:
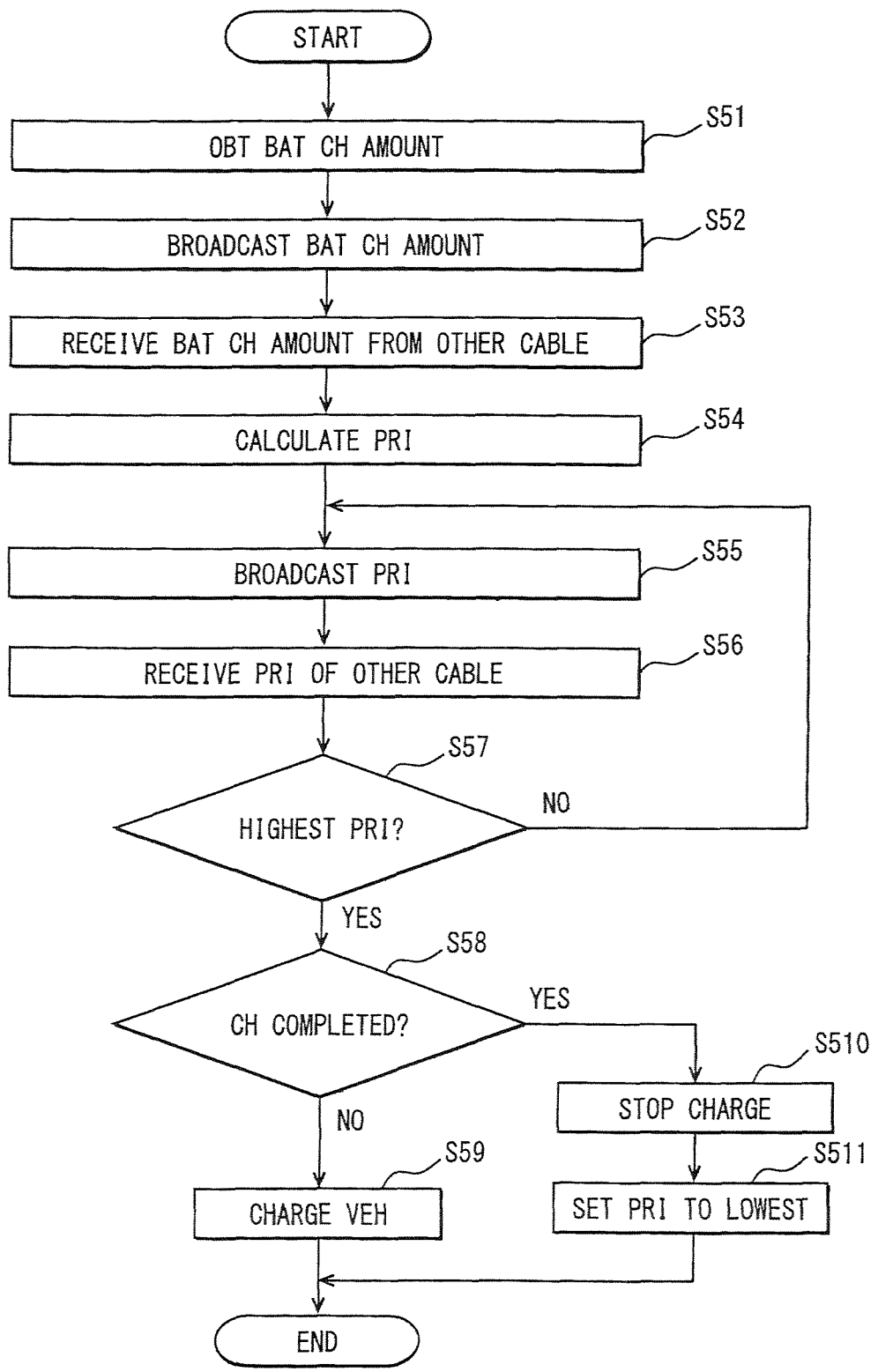
FIG. 22 is a flowchart showing a control process for charging multiple vehicles according to a priority order in a sixth embodiment.

The process in FIG. 22 is repeated for a short time under a condition that the control portion 25 is energized. Further, in order to supply electricity to the communication portion 64 and the control portion 25 of all charge cable devices 10, the second relay 27 is always controlled to be closed when the electricity is supplied from the connector plug 14.

At step S51, the control portion 25 obtains the charge amount of the vehicle 50, which is connected to the device 10. Then, it goes to step S52. At step S52, the device 10 broadcasts the obtained vehicle information, i.e., the battery charge amount, to other devices 10. Specifically, the device 10 transmits the obtained vehicle information to all of other devices 10 simultaneously. Then, it goes to step S53.

At step S53, the device 10 receives the vehicle information, i.e., the battery charge amount from other charge cable devices 10. Then, it goes to step S54. At step S54, the portion 25 compares the battery charge amount of all charge cable devices 10, and calculates the priority of the vehicle 50 such that the priority is high when the battery charge amount is small. Thus, it goes to step S55.

At step S55, the device 10 broadcasts the priority of the vehicle to other devices 10, and then, it goes to step S56. At step S56, the device 10 obtains the priority information of other charge cable devices 10, and then, it goes to step S57.

At step S57, the portion 25 determines whether the priority of the vehicle is the highest priority. When the priority is the highest priority, it goes to step S58. When the priority is not the highest priority, it goes to step S55. At step S58, since the priority is the highest priority, the portion 25 determines whether the charge of the vehicle connected to the device 10 is completed. When the charge is completed, it goes to step S510. When the charge is not completed, it goes to step S59. At step S59, since the charge is not completed, the portion 25 controls the first relay 26 to supply electricity to the vehicle 50. Then, the portion 25 ends the process.

At step S510, since the charge is completed, the portion 25 stops supplying electricity to the vehicle 50, and then, it goes to step S511. At step S511, since the charge is completed, the portion 25 sets the priority of the vehicle 50 to be the lowest priority. Then, the portion 25 ends the process.

Thus, based on the vehicle information, the vehicles 50 are charged according to the ascending order of the battery charge amount. Thus, the vehicles 50 are charged according to the ascending order of the battery charge amount.

Further, the control portions 25 of the charge cable devices 10 may communicate with each other and adjust the priority. For example, when the user requests to supply electricity to multiple vehicles 50 at the same time, the control portions 25 may control to distribute the electricity equally to the vehicles 50. Thus, the control portions 25 execute flexible control.

Seventh Embodiment

Figure 23:
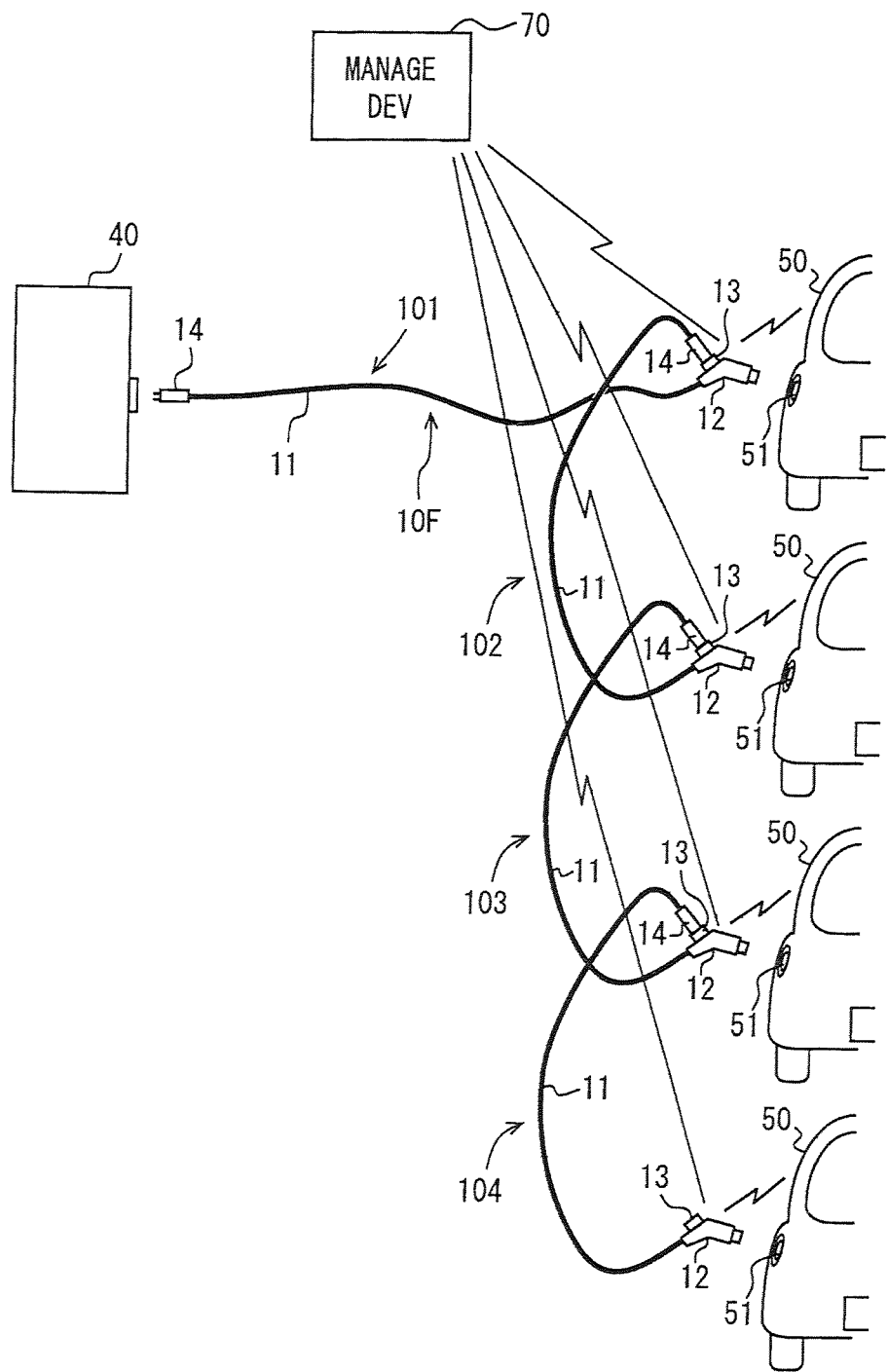
FIG. 23 is a diagram showing multiple charge cable devices according to a seventh embodiment.
Figure 24:
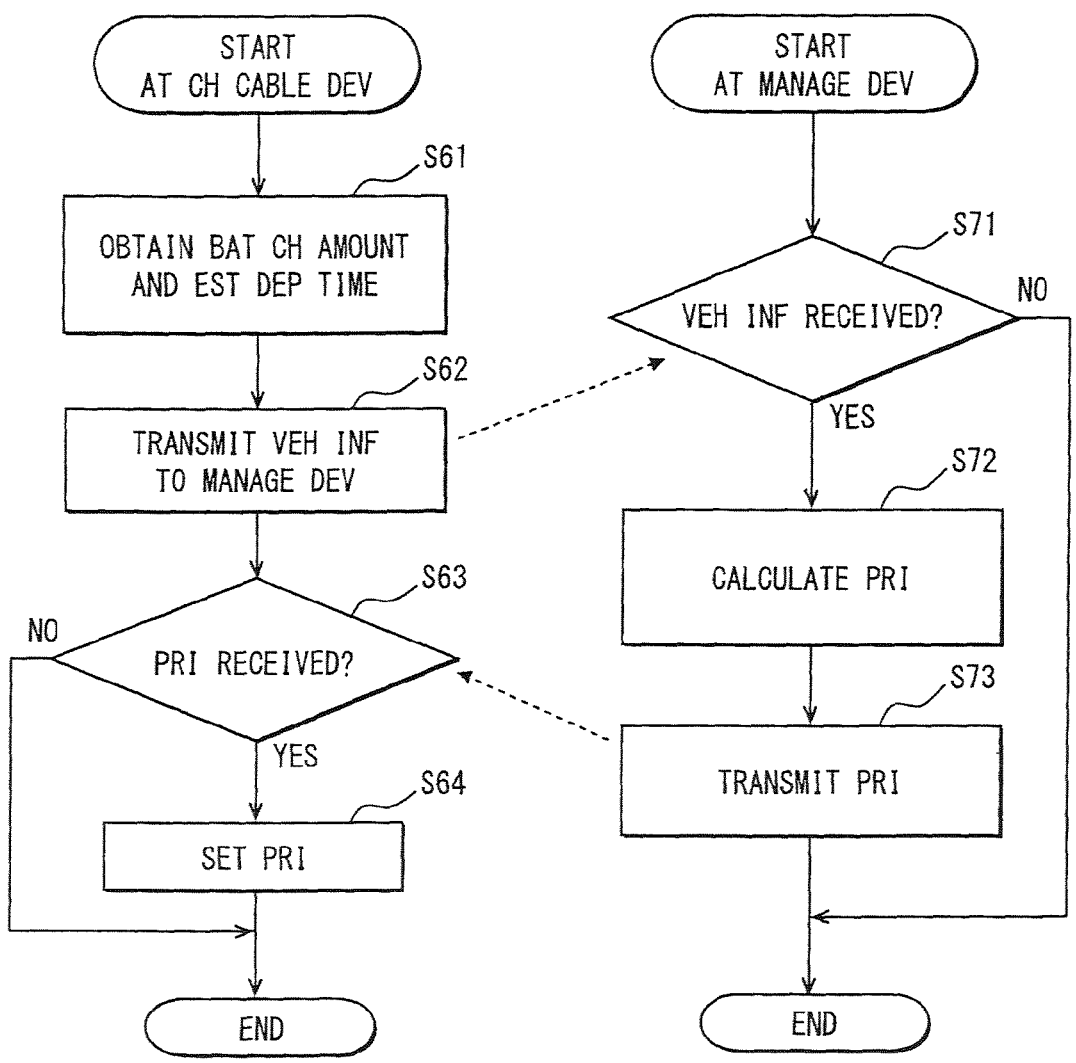
FIG. 24 is a flowchart showing a control process for controlling the charge cable devices for charging multiple vehicles according to the priority order and another control process of a management device.

A charge cable device according to a seventh embodiment will be explained with reference to FIGS. 23-24. As shown in FIG. 23, a charge cable device 10F according to the present embodiment communicates with not only other charge cable devices 10F but also a management device 70. The management device 70 is referred as a HEMS (home energy management system). The management device 70 manages not only the battery in the vehicle 50 but also the energy in a building or a house. Thus, the management device 70 is a system for saving energy as a whole. The communication portion 64 obtains the vehicle information, similar to the sixth embodiment. The control portion 25 sets the priority based on the information received from the management device 70 and the vehicle 50.

The process of the charge cable device 10F shown in FIG. 23 is repeated for a short time under a condition that the electricity is supplied to the control portion 25. The management process of the management device 70 shown in FIG. 23 is repeated for a short time under a condition that the electricity is supplied. Further, in order to supply electricity to the communication portion 64 and the control portion 25 of all charge cable devices 10F, the second relays 27 are always controlled to be closed when the electricity is supplied via the connector plug 14.

The process of the charge cable device 10F will be explained as follows. At step S61, the portion 25 obtains the vehicle information such as the battery charge amount and the schedule time of departure (i.e., estimated time of departure) of the vehicle 50, which is connected to the device 10F. Then, it goes to step S62. At step S62, the device 10F transmits the obtained vehicle information of the vehicle 50 to the management device 70. Then, it goes to step S63.

At step S63, the device 10F determines whether the priority information of the vehicle 50 is received from the management device 70. When the priority information is received, it goes to step S64. When the priority information is not received, the device 10F ends the process. At step S64, the priority is set, and then, the device 10f ends the process. After that, the device 10F executes steps S44 to S48 in FIG. 21.

Next, the process of the management device 70 will be explained as follows. At step S71, the management device 70 determines whether the vehicle information of the vehicle 50 is received from each charge cable device 10F. When the vehicle information is received, it goes to step S72. When the vehicle information is not received, the management device 70 ends the process. At step S72, the management device 70 compares the information of the vehicles 50 from all charge cable devices 10F. The management device 70 calculates the priority of each vehicle 50 according to a certain condition. Then, it goes to step S73. At step S73, the management device 70 transmits the calculated priority to each charge cable device 10F, and then, the device 70 ends the process.

Thus, based on the vehicle information received by the management device 70, the device 70 sets the priority. Since the management device 70 has a high level of processing performance, the device 70 can determine the priority according to various conditions. Accordingly, even if the processing performance of the control portion 25 in the charge cable device 10F is low, the optimum priority is calculated for a short time.

Eight Embodiment

Figure 25:
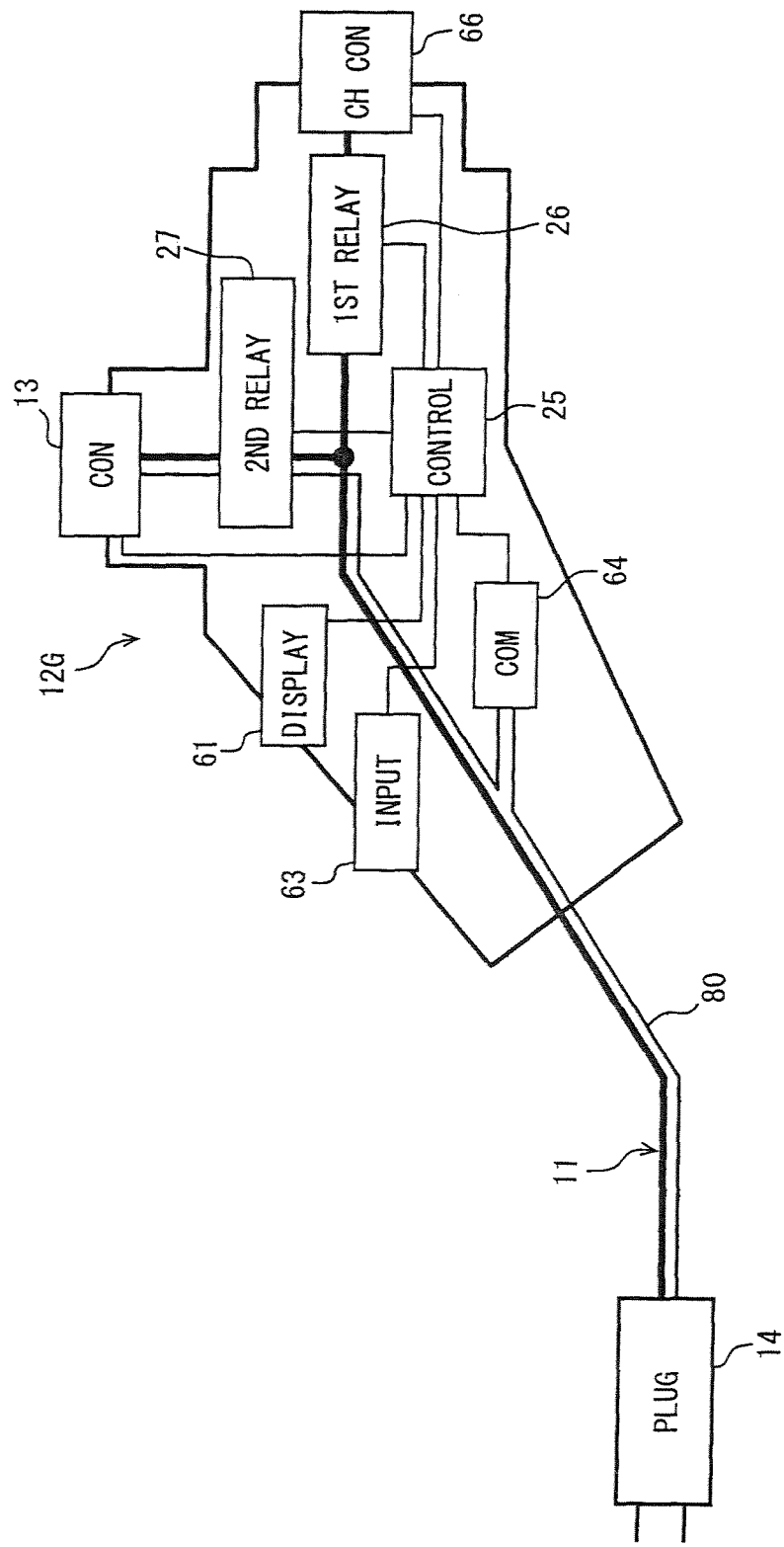
FIG. 25 is a diagram showing a simplified view of an electric construction of a charge plug and a connection part according to an eighth embodiment.

A charge cable device according to an eighth embodiment will be explained with reference to FIGS. 25-26. As shown in FIG. 25, the electric power line 21 and the communication line 80 are separated from each other. The communication portion 64 utilizes a two channel wired communication method so that two channel includes a connector side channel and a connector plug side channel.

Figure 26:
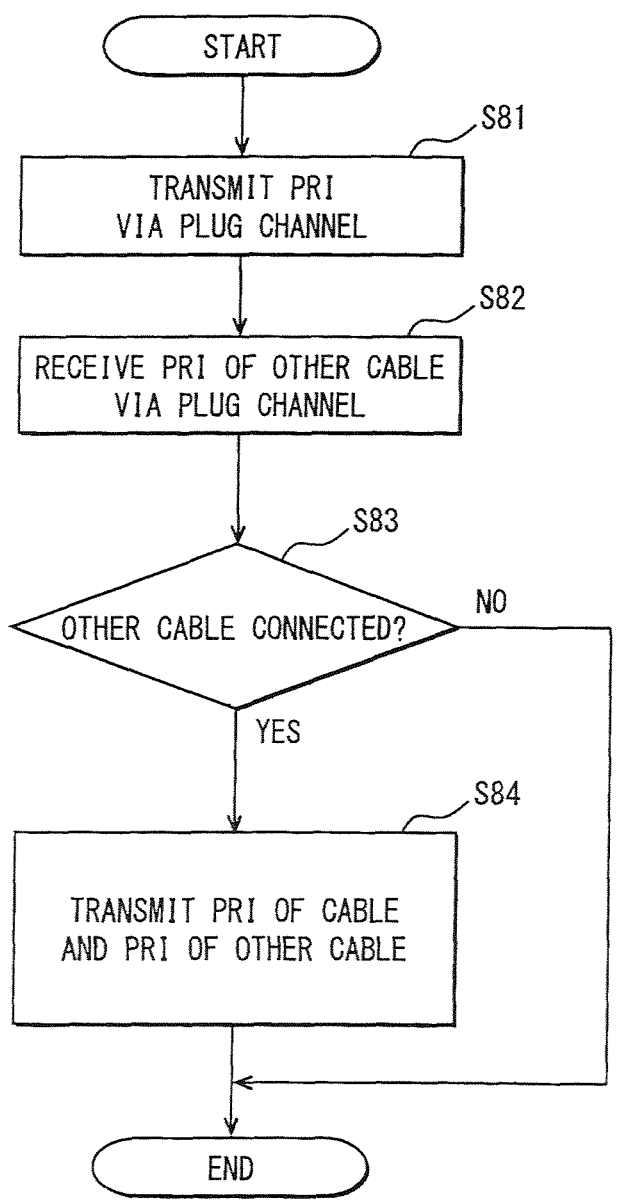
FIG. 26 is a flowchart showing a process relating to communication.

The process shown in FIG. 26 is repeated for a short time under a condition that the electricity is supplied to the control portion 25. In order to supply electricity to all of the communication portions 64 and the control portions 25 of the charge cable devices 10G, the second relays 27 are always controlled to be closed when the electricity is supplied from the connector plugs 14.

At step S81, the portion 25 controls the communication portion 64 to transmit the priority information about the priority from the connector plug side channel. Then, it goes to step S82. At step S82, the device 10G receives the priority of another charge cable device 10G, and then, it goes to step S83.

At step S83, the device 10G determines whether the connector 13 connects to another charge cable device 10G. When the connector 13 connects to another charge cable device 10G, it goes to step S84. When the connector 13 does not connect to another charge cable device 10G, the device 10G ends the process. At step S84, the device 10G transmits the priority of the vehicle 50 via the connector side channel and the priority of another charge cable device 10G received via the connector plug 14. Then, the device 10G ends the process.

Thus, since the device 10G utilizes two channels, the communication line 80 is isolated at each cable 11. Accordingly, cross talk or interference among the cables 11 is improved.

Ninth Embodiment

Figure 27:
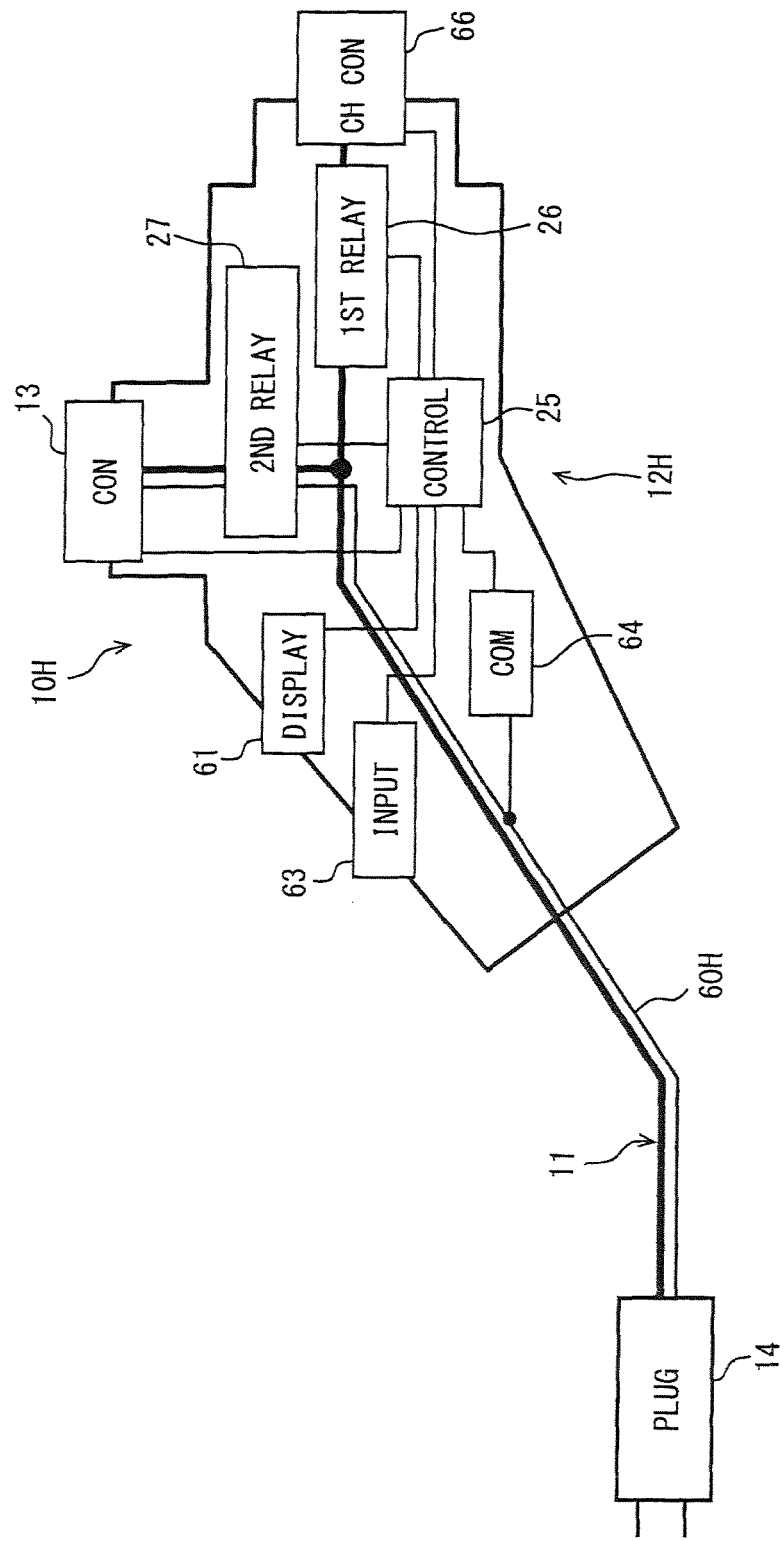
FIG. 27 is a diagram showing a simplified view of an electric construction of a charge plug and a connection part according to a ninth embodiment.

A charge cable device according to a ninth embodiment will be explained with reference to FIGS. 27-28. As shown in FIG. 27, the electric power line 21 and the communication line 80H are separated from each other. The communication portion 64 has one channel wired communication system so that the communication portion 64 communicates with a connector side and a connector plug side. For example, the communication system is provided by a CAN (which is a registered trademark) or a Ethernet (which is a registered trademark) as a protocol for allowing multiple node connection. Accordingly, the information transmitted from the communication portion 64 via the communication line 80H is received by all charge cable devices 10H, which are connected to the communication system.

Figure 28:
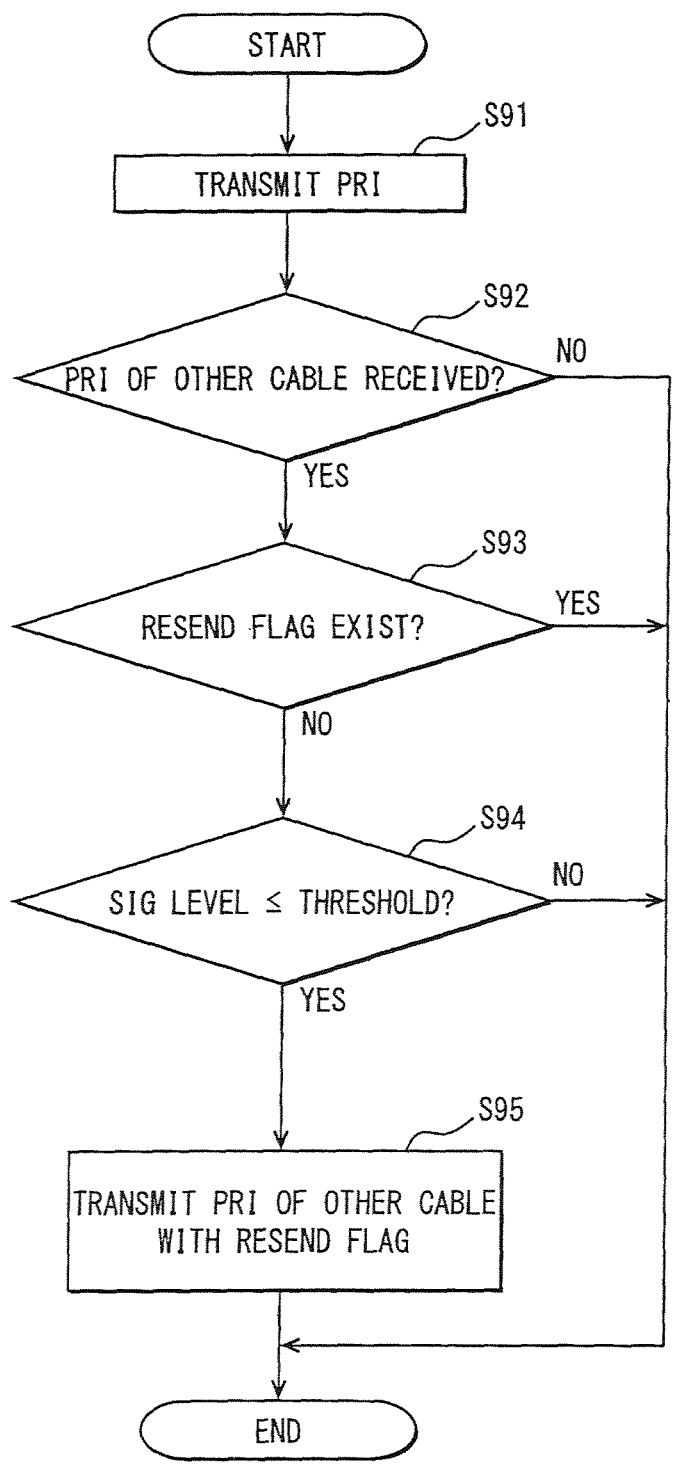
FIG. 28 is a flowchart showing a process relating to communication.

The process in FIG. 28 is repeated for a short time under a condition that the electricity is supplied to the control portion 25. In order to supply electricity to all of the communication portions 64 and the control portions 25 of the charge cable devices 10H, the second relays 27 are always controlled to be closed when the electricity is supplied from the connector plugs 14.

At step S91, the device 10H controls the communication portion 64 to transmit the priority of the vehicle 50. Then, it goes to step S92. At step S92, the device 10H determines whether the priority of another charge cable device 10H is received. When the priority of another charge cable device 10H is received, it goes to step S93. When the priority of another charge cable device 10H is not received, the device 10H ends the process.

At step S93, the device 10H determines whether a resend flag exists in received data. When the resend flag exists, the device 10H ends the process. When the resend flag does not exist, it goes to step S94. At step S94, the device 10H determines whether a signal level of data received is equal to or smaller than a predetermined threshold level. When the signal level is equal to or smaller than the threshold level, it goes to step S95. When the signal level is not equal to or smaller than the threshold level, the device 10H ends the process.

At step S95, the device 10H transmits the priority of another charge cable device 10H with the resend flag, and then, the device 10H ends the process.

Thus, when the received data does not include the resend flag, and the signal level is equal to or smaller than the threshold level, so that the data is deteriorated, the resend flag is added. Thus, the data with the resend flag is not utilized. Thus, the device 10H does not utilize the deteriorated data.

Other Embodiments

The charge cable device 10 according to the first embodiment and the charge cable device 10 according to the second embodiment may be combined so that the device 10 in the first embodiment is connected in series with the device 10 in the second embodiment. Accordingly, an optimum combination of the charge cable devices according to the first embodiment and the charge cable devices according to the second embodiment is appropriately selected according to the parking position of the vehicles 50 and the positioning relationship between the vehicles 50 and the charge station 40, so that the vehicles 50 are connected to the charge cable devices 10, respectively.

When the priority is determined, the specific identification information of each charge cable device 10, which is preliminarily put in the device 10, may be utilized. In this case, the communication portion 64 transmits the identification information to another charge cable device 10, and receives the identification information of another charge cable device 10. The control portion 25 sets the priority according to the identification information transmitted and received via the communication portion 64. Specifically, for example, when the identification information is the number, the electricity is supplied in priority to the cable 11 having the large or small number. Thus, the priority is set by a simply control method.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A charge cable device detachable from another charge cable device comprising:
a cable having one end, which is detachable from an electric power source or another charge cable device, and an electric power line, which supplies electricity to a vehicle from the electric power source when the one end is attached to the electric power source, and supplies electricity to the vehicle from another charge cable device when the one end is attached to another charge cable device;
a charge connector arranged on the other end of the cable, the charge connector being detachable from a charge inlet of the vehicle, and being attached to the charge inlet of the vehicle when the electric power line supplies electricity to the vehicle;
a cable connector detachable from further another charge cable device, the cable connector electrically connecting between further another charge cable device and the electric power line when the cable connector is attached to further another charge cable device; and
a controller controlling an electric power supply amount of electricity to the charge connector from the one end of the cable and an electric power supply amount of electricity to further another charge cable device connected to the cable connector from the one end of the cable, wherein:
when the cable connector is not attached to further another charge cable device, the controller controls to supply electricity from the one end of the cable to the charge connector; and
when the cable connector is attached to further another charge cable device, the controller controls the electric power supply amount of electricity to the charge connector from the one end of the cable and the electric power supply amount of electricity to further another charge cable device connected to the cable connector from the one end of the cable.

2. A charge cable device detachable from another charge cable device comprising:
a cable having one end, which is attached to an electric power source, and an electric power line, which supplies electricity to a vehicle from the electric power source;
a charge connector arranged on the other end of the cable, the charge connector being detachable from a charge inlet of the vehicle, and being attached to the charge inlet of the vehicle when the electric power line supplies electricity to the vehicle;
a cable connector detachable from further another charge cable device, the cable connector electrically connecting between further another charge cable device and the electric power line when the cable connector is attached to further another charge cable device; and
a controller controlling an electric power supply amount of electricity to the charge connector from the electric power source and an electric power supply amount of electricity to further another cable device connected to the cable connector from the electric power source, wherein:
when the cable connector is not attached to further another charge cable device, the controller controls to supply electricity from the electric power source to the charge connector; and
when the cable connector is attached to further another charge cable device, the controller controls the electric power supply amount of electricity to the charge connector from the electric power source and the electric power supply amount of electricity to further another charge cable device connected to the cable connector from the electric power source.

3. The charge cable device according to claim 1, wherein:
when the cable connector is attached to further another charge cable device, the controller controls each of the electric power supply amount to the charge connector and the electric power supply amount to further another charge cable device according to a predetermined priority.

4. The charge cable device according to claim 3, wherein:
the predetermined priority is determined according to a connecting order of charge cable devices from the electric power source in such a manner that a charge cable device disposed nearer the electric power source is prioritized over another charge cable device disposed farther from the electric power source.

5. The charge cable device according to claim 3, wherein:
the predetermined priority is determined according to a connecting order of charge cable devices from the electric power source in such a manner that a charge cable device disposed farther from the electric power source is prioritized over another charge cable device disposed nearer the electric power source.

6. The charge cable device according to claim 3, further comprising:
a communication portion for communicating with another charge cable device, wherein:
the controller sets the predetermined priority based on information obtained via the communication portion.

7. The charge cable device according to claim 6, wherein:
identification information is put in each charge cable device;
the communication portion transmits the identification information to another charge cable device, and receives identification information of another charge cable device; and
the controller sets the predetermined priority based on transmitted identification information and received identification information.

8. The charge cable device according to claim 6, further comprising:
an input portion for inputting priority information related to the predetermined priority, wherein:
the communication portion transmits the priority information to another charge cable device, and receives priority information of another charge cable device; and
the controller sets the predetermined priority based on transmitted priority information and received priority information.

9. The charge cable device according to claim 6, further comprising:
an information obtaining device for obtaining vehicle information related to the vehicle, to which the charge connector is attached, wherein:
the communication portion transmits the vehicle information to another charge cable device, and receives vehicle information of another charge cable device; and
the controller sets the predetermined priority based on the transmitted vehicle information and the received vehicle information.

10. The charge cable device according to claim 6, wherein:
the communication portion communicates with a management device for managing vehicle information related to the vehicle; and
the controller sets the predetermined priority based on the vehicle information from the management device.

11. The charge cable device according to claim 6, wherein:
the communication portion communicates with another charge cable device, which is attached to the cable connector, via the cable; and
when the controller transmits information, which is received from another charge cable device, to further another charge cable device, the controller executes a protection processing on the received information for protecting the received information from degradation attributed to wire communication.

12. The charge cable device according to claim 3, further comprising:
a notifying device for notifying the predetermined priority.

13. The charge cable device according to claim 3, wherein:
when the cable connector is attached to further another charge cable device, and a state that the charge connector is not attached to the charge inlet is changed to a state that the charge connector is attached to the charge inlet, the controller updates the predetermined priority, and the controller controls each of the electric power supply amount to the charge connector and the electric power supply amount to further another charge cable device according to the updated predetermined priority.

14. The charge cable device according to claim 1, wherein:
the controller controls the electric power line to stop supplying electricity to further another charge cable device when the electric power line supplies electricity to the vehicle; and
when a predetermined charge completion condition for charging the vehicle is satisfied, the controller controls the electric power line to supply electricity to further another charge cable device.

15. The charge cable device according to claim 1, wherein:
when the cable connector is attached to further another charge cable device, and the charge connector is not attached to the charge inlet, the controller stop supplying electricity to the charge connector, and supplies electricity to further another charge cable device.

16. The charge cable device according to claim 1, wherein:
the cable connector is integrated with the charge connector.

17. The charge cable device according to claim 1, wherein:
the cable connector is disposed at a middle of the cable.

18. The charge cable device according to claim 1, wherein:
the cable connector includes:
a connection structure, to which further another charge cable device is attached in a direction from a lower side to an upper side when the charge connector is attached to the charge inlet; and
a cover for covering an outside of the connection structure.

* * * * *